(12) United States Patent
Dean et al.

(10) Patent No.: US 7,614,640 B2
(45) Date of Patent: Nov. 10, 2009

(54) FOLDABLE STROLLER HAVING RETRACTABLE CUP HOLDER

(75) Inventors: Roy L. Dean, Pottstown, PA (US); Robert T. Pike, Reading, PA (US)

(73) Assignee: Graco Children's Products Inc., Atlanta, GA (US)

( * ) Notice: Subject to any disclaimer, the term of this patent is extended or adjusted under 35 U.S.C. 154(b) by 204 days.

(21) Appl. No.: 11/688,836

(22) Filed: Mar. 20, 2007

(65) Prior Publication Data

US 2007/0222188 A1    Sep. 27, 2007

Related U.S. Application Data

(60) Provisional application No. 60/784,103, filed on Mar. 20, 2006.

(51) Int. Cl.
*B62B 9/12*    (2006.01)
*B62B 7/06*    (2006.01)

(52) U.S. Cl. ...................... 280/642; 280/647

(58) Field of Classification Search ............... None
See application file for complete search history.

(56) References Cited

U.S. PATENT DOCUMENTS

| 6,095,060 | A  | * | 8/2000  | Ma ........................... 108/45 |
| 7,121,517 | B2 | * | 10/2006 | Oana ....................... 248/311.2 |
| 2003/0057682 | A1 | * | 3/2003 | Yoshie et al. ............... 280/647 |
| 2004/0094935 | A1 | * | 5/2004 | Fair et al. .................... 280/642 |
| 2007/0024029 | A1 | * | 2/2007 | Dotsey et al. ............... 280/642 |

\* cited by examiner

*Primary Examiner*—Jeffrey J Restifo
*Assistant Examiner*—Chiedu A Chibogu
(74) *Attorney, Agent, or Firm*—Lempia Braidwood LLC

(57) ABSTRACT

A stroller is provided having a stroller frame supported by front and rear wheels. The frame includes a latch assembly that is movable between a locked and an unlocked position. When in the locked position, the latch assembly prevents the frame from being folded. When in the unlocked position, the latch assembly allows the frame to be folded. A cup holder is supported by the frame that can move between an extended and a retracted position. The cup holder automatically moves to the retracted position when the stroller is folded.

17 Claims, 23 Drawing Sheets

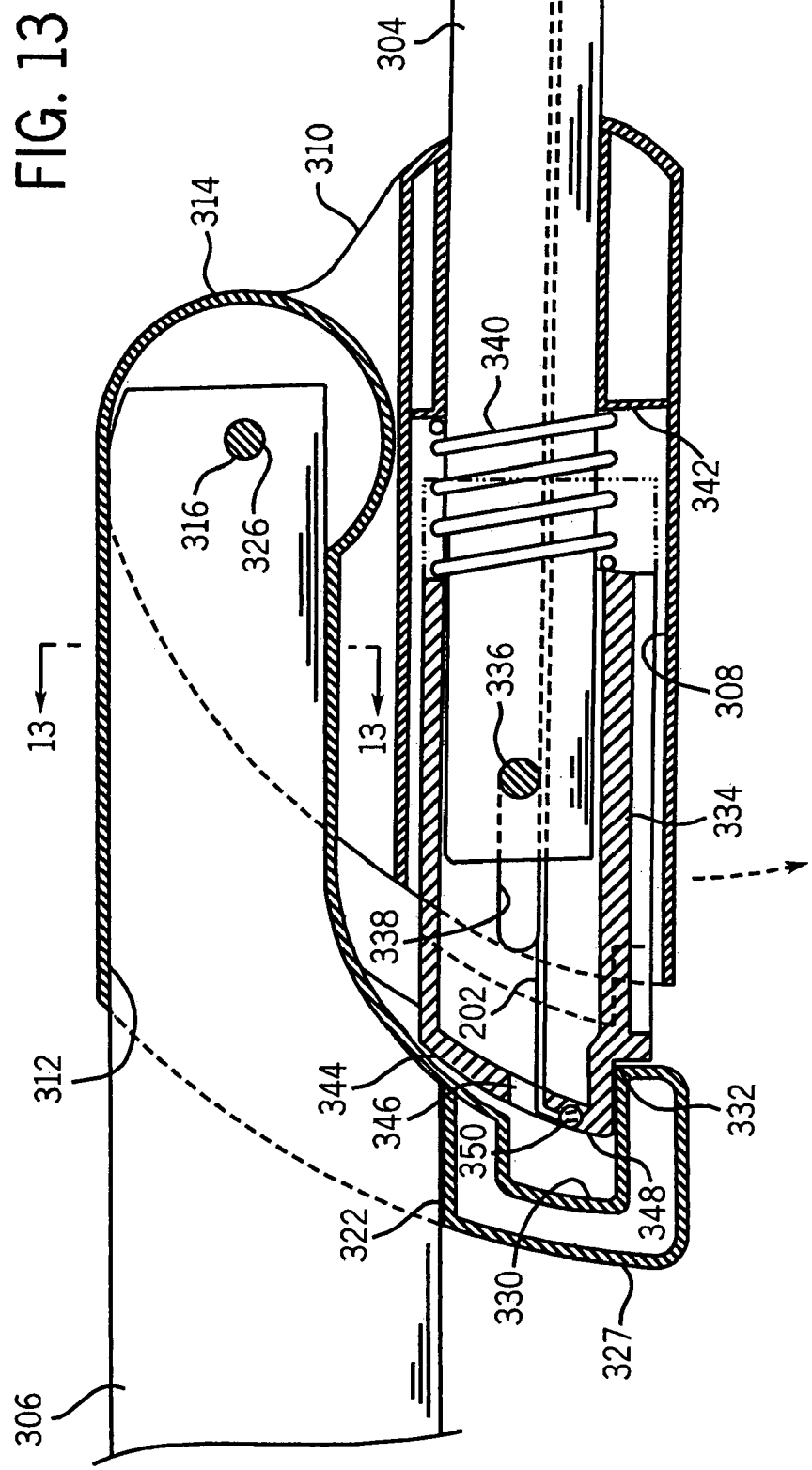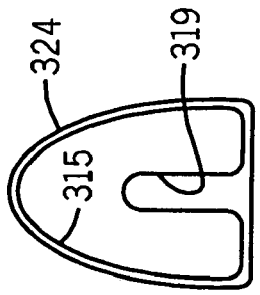

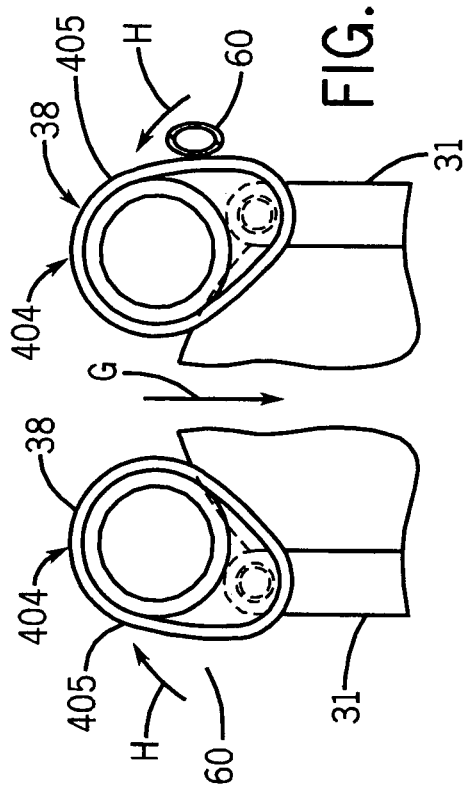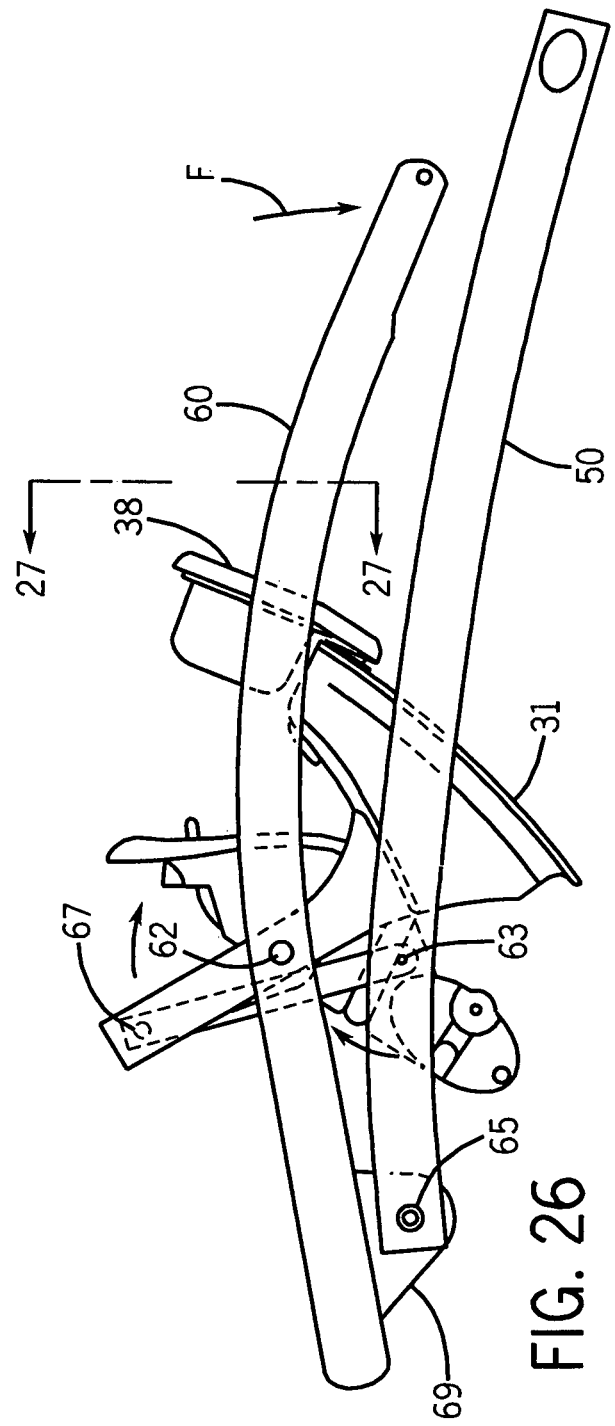

FOLDABLE STROLLER HAVING RETRACTABLE CUP HOLDER

RELATED APPLICATION DATA

This application claims the benefit of provisional application No. 60/784,103 filed Mar. 20, 2006, the disclosure of which is hereby incorporated by reference as if set forth in its entirety herein.

BACKGROUND

1. Field of the Disclosure

The present invention relates to strollers for children, in particular strollers that are easily folded to a stored, compact configuration.

2. Description of Related Art

Well-designed strollers should be sturdy and balanced. It should afford the child passenger safe and comfortable transport. The adult user should find the stroller easy to maneuver, easy to fold and unfold, and easy to handle when folded. It should have features that make it versatile and convenient. And it should be simple in design, rugged and reliable. Foldable strollers are known that address some of these criteria.

A conventional folding stroller has a plurality of wheels supporting an articulated frame that has two spaced front legs, two spaced rear legs, a pair of push arms, and a crossbar connected at its laterally outer ends to the push arms. The crossbar can be provided with a pair of laterally spaced gripping surfaces that can be engaged by a user when driving the stroller, and a handle assembly disposed between the gripping surfaces. The stroller further includes a pair of fold latches associated with the push arms that operate to lock the stroller frame in the erect (open) position and to unlock the stroller frame, thereby allowing the frame to fold to a closed position.

A cable or other motion transfer mechanism is disposed within the stroller frame, and is connected between the handle assembly and the fold latches. Accordingly, a user can actuate (typically rotate) the handle, which converts the rotational motion and applies a linear force to the cable to lock and release the fold latches, thereby permitting the stroller to fold and unfold.

It is further desirable to maximize the versatile utility of the stroller. For this reason, conventional strollers include a plurality of accessories. One such accessory is a cup holder, one or more of which are provided proximate to the child seat for the storage of, for instance, a beverage of the seated occupant. Unfortunately, cup holders can interfere with the stroller frame when the stroller is articulated to its folded configuration. Cup holders can further occupy space near the child seat, and therefore interfere with the ingress and egress of the child into and out of the child seat. Furthermore, even if the cup holder does not interfere with the frame, it may nevertheless be prone to damage, particularly when the stroller is folded. In order to reduce the risk of damage to the cup holder, and to facilitate easy stroller folding, conventional cup holders are either manually retractable into a protective pocket, or removable altogether. Unfortunately, user effort is required to remove or retract the cup holder. Furthermore, the user can forget to remove or retract the cup holder, thus rendering the cup holder susceptible to damage.

What is therefore needed is a cup holder that retracts, or stows, automatically from an extended position as the stroller is folded. It would also be further desirable for the cup holder to be positioned out of interference with the ingress and egress of the child into and out of the child seat when the cup holder is in the extended position.

SUMMARY

A stroller that is foldable between an open position and a folded position. The stroller includes a foldable stroller frame movably supported by front and rear wheels. A child seat is supported by the stroller frame. A cup holder is juxtaposed with the child seat, and the cup holder is movable between a retracted position and an extended position. A biasing assembly provides a force against the cup holder that biases the cup holder toward the extended position. When the stroller frame is folded, the stroller frame applies a force against the cup holder that overcomes the force of the biasing assembly and causes the cup holder to move toward the retracted position.

It should be appreciated that the foregoing and other aspects of the invention will appear from the following description. In the description, reference is made to the accompanying drawings which form a part thereof, and in which there is shown by way of illustration, and not limitation, preferred embodiments of the invention. Such embodiments do not necessarily represent the full scope of the invention, and reference must therefore be made to the claims herein for interpreting the full scope of the invention.

BRIEF DESCRIPTION OF THE DRAWINGS

Reference is made to the following drawings in which like reference numerals are intended to identify like elements throughout, and in which:

FIG. 12 is a sectional side elevation view of the latch assembly illustrated in FIG. 10 taken along line 12-12;

FIG. 13 is a partial sectional side elevation view of the latch assembly illustrated in FIG. 12 taken along line 13-13;

FIG. 26 is a side elevation view of the portion of the stroller illustrated in FIG. 24 with the stroller frame in the fully folded configuration; and FIG. 27 is a side elevation view taken along line 27-27 of FIG. 26.

DETAILED DESCRIPTION

Figure 1A:
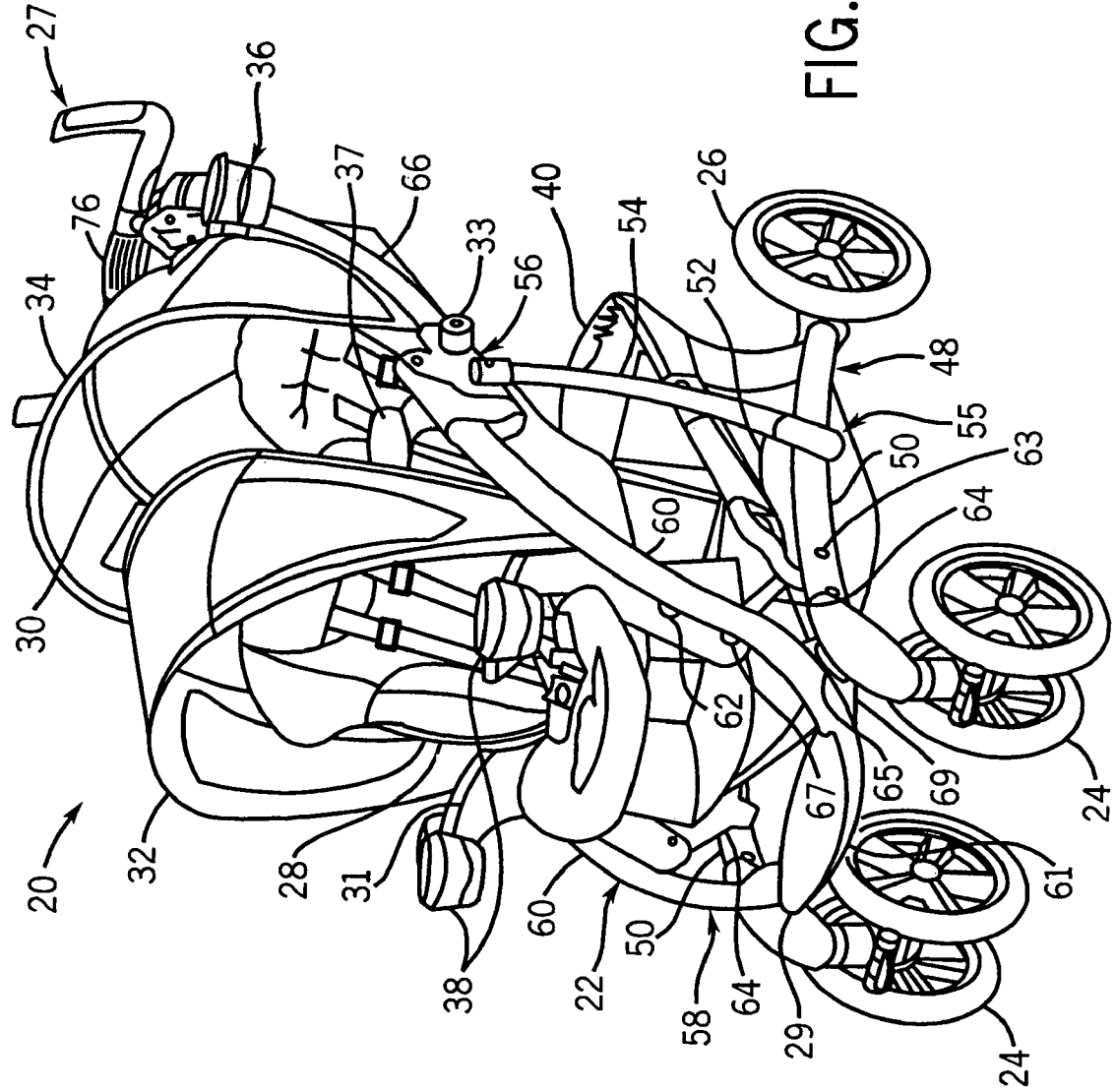
FIG. 1A is a perspective view of a double stroller constructed in accordance with certain aspects of the present invention, wherein the stroller is illustrated in a fully open (erect) configuration.

Referring to FIG. 1A, an exemplary stroller 20 includes a foldable frame 22 supported for movement via a pair of laterally spaced front wheels 24 and a pair of laterally spaced rear wheels 26. A handlebar 27 extends upward and rearward from the rear end of the frame 22. The frame components can be made from tubular aluminum, though steel or other suitable alternative materials having sufficient strength and rigidity could be used. The frame 22 supports an adjustable front child seat 28 and corresponding footrest 29 and armrest 31, and an adjustable rear child seat 30 and corresponding footrest and armrest (not shown). Each child seat 28 and 30 can be provided with a tray 37, and one or more child cup holders 38 can be connected to each armrest 31 or otherwise disposed in juxtaposition with the child seat 28 and/or 30 for the storage of beverages and the like. Advantageously, the cup holder 38 is automatically retractable, thereby avoiding the need to either remove the cup holder 38 or manually retract the cup holder 38 prior to folding the frame 22 (as is the case with conventional strollers having cup holders) in order to minimize the risk of damage to the cup holders 38 while the stroller 20 is in its folded configuration. The construction and operation of each cup holder 38 is described in more detail below with reference to FIGS. 14-27.

The stroller 20 can further include one or more accessories. For instance, front and rear canopies 32 and 34 are provided in juxtaposition with the front and rear child seats 28 and 30, respectively. Additionally, a parent console 36 is provided adjacent the handlebar 27, and can include, for instance, any combination of a tray and one or more cup holders. A basket 40 can be provided below the rear child seat 30 for the storage and transportation of miscellaneous items as desired.

In the embodiment illustrated in FIG. 1A, the frame 22 is supported by a chassis 48 that includes a pair of longitudinally elongated legs 50 forming the base of the frame 22. A rear axle 52 extends laterally between the legs 50 and is rigidly connected to the rear ends of the legs 50. The axle 52 rotatably supports the wheels 26 in the usual manner. The front ends of the legs 50 rotatably support the front wheels 24, in the form of a duplex caster, in the usual manner.

A side support strut 54 is pivotally connected to each leg 50, and extends substantially vertically upward from the leg 50. Specifically, each strut 54 is spaced from the front and rear ends of the legs 50, and are connected to a middle portion of the legs 50. Each strut 54 can include a shock absorbing assembly 55 constructed in the usual manner. The upper ends of each strut 54 are pivotally connected to an outer surface of a corresponding foldable latch assembly 56. The latch assembly 56 further receives the rear terminal ends of a U-shaped support bar 58.

The support bar 58 includes a pair of laterally spaced side arms 60 that provide the front legs of the frame 22. The front legs 60 are connected at their forward ends to a U-shaped section 61, which supports the footrest 29, The side arms 60 extend laterally outboard of the canopy 32 and the armrests 31, and are pivotally connected to the outer surface of the armrests 31 substantially midway between the front and rear ends of the side arms 60 at pivot joint 62. Pivot joint 62 is further disposed substantially vertically midway up the armrest 31. A linkage 64 connects each corresponding leg 50 to the corresponding armrest 31. Specifically, an upper pivot joint 67 connects the upper end of the linkage 64 to the lower end of the corresponding armrest 31. Pivot 67 is thus disposed below (and slightly forward of) pivot 62. A lower pivot joint 63 connects the lower end of the linkage 64 to the leg 50 at a location that is spaced forward with respect to the strut 54. A pivot joint 65 pivotally connects the front end of each leg 50 to the support bar 58 via a flange 69 that extends down from the support bar 58.

The front legs 60 and base legs 50 can have cross-sections that are oblong or oval, for instance elliptical. Such sections have a stronger section modulus as compared to round tubing having the same cross-sectional area, thus enhancing vertical load strength and imparting a robust appearance onto the stroller 20. The front legs 60 and the base legs 50 can also be about the same length, so that they fold compactly onto each other. The base legs 50 can bow upwardly such that its convex side faces up, thus providing greater ground clearance between the front and the rear wheels than a straight leg. The front legs 60 can also be curved similar to the curvature of base legs 50, thereby allowing the front legs 60 to compactly nest with legs 50 when the stroller 20 is folded.

Figure 2A:
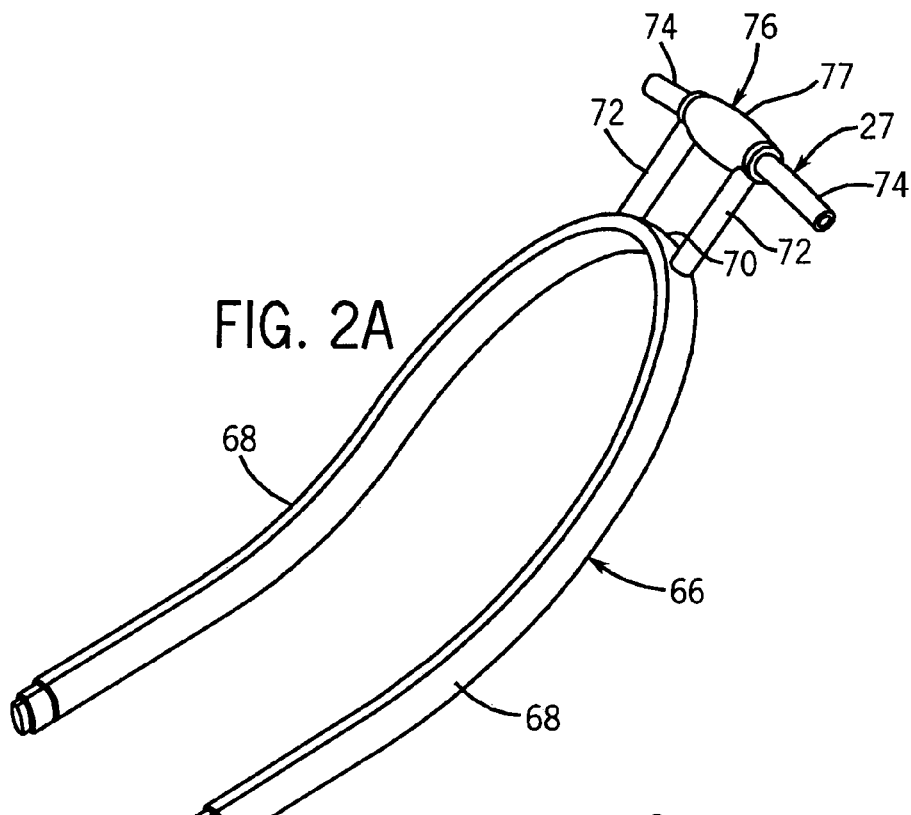
FIG. 2A is a perspective view of a portion of a stroller frame including a handle assembly constructed in accordance with one embodiment of the present invention.
Figure 2B:
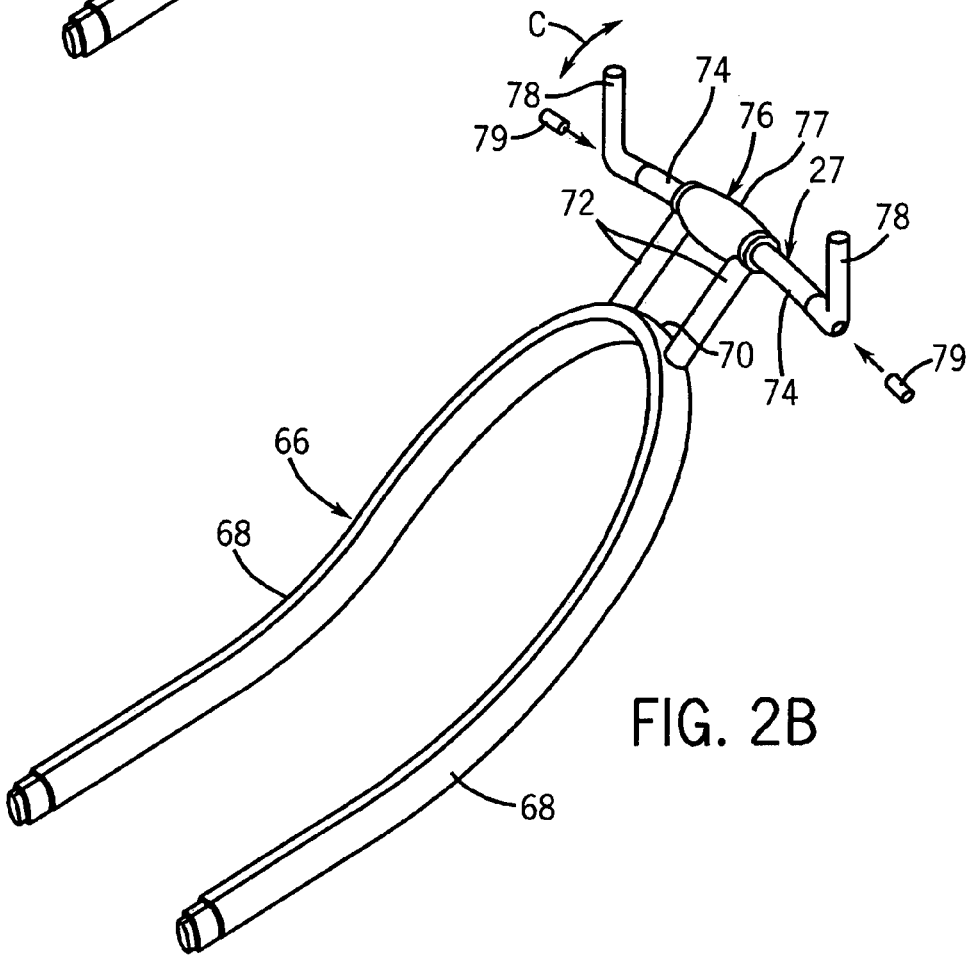
FIG. 2B is a perspective view of the portion of a stroller frame illustrated in FIG. 2A but including auxiliary handle gripping surfaces constructed in accordance with certain aspects of the present invention.

Referring also to FIGS. 2A and 2B, the stroller frame 22 includes a U-shaped push arm 66 including a pair of side arms 68 connected at their front ends to the latch assembly 56. The side arms extend rearward and upward from the latch assembly 56 when the stroller is erect, and are connected at their rear ends at a U-shaped section 70. A pair of laterally spaced stanchions 72 is connected to the U-shaped section 70, and extends rearward and upward from the U-shaped section 70. The handlebar 27 extends substantially laterally and is connected to the rear ends of the stanchions 72.

As illustrated in FIG. 2A, the handlebar 27 defines terminal ends at its laterally outer ends. A pair of grips 74 is located at both lateral ends of the handlebar 27 outboard of the stanchions 72. The handlebar includes a latch release handle 76 that also includes a grip 77 disposed between the stanchions 72. As illustrated in FIG. 2B, a pair of auxiliary grips 78 extends out from the lateral terminal ends of the handlebar 27. In one embodiment, the auxiliary grips 78 extend perpendicular from the handlebar 27, and in one aspect can extend vertically or at any desired angle with respect to the vertical. The auxiliary grips 78 can assume any suitable shape and form that provides an ergonomically friendly grip. For instance, they can be curved along one or more planes. In certain aspects of the invention, the grips 78 are pivotally connected to the laterally outer ends of the handlebar 27 such that the angular orientation of the grips 78 can be adjustable and locked in the desired position. The present invention therefore provides a discrete handlebar 27 having terminal outer ends. Advantageously, the handlebar 27 can be ergonomically designed as opposed to conventional handlebars, which are an integral part of the stroller frame 22. Furthermore, as will be described in more detail below, the present invention allows the discrete handlebar 27 to lock and unlock the latch assembly 56.

Figure 1B:
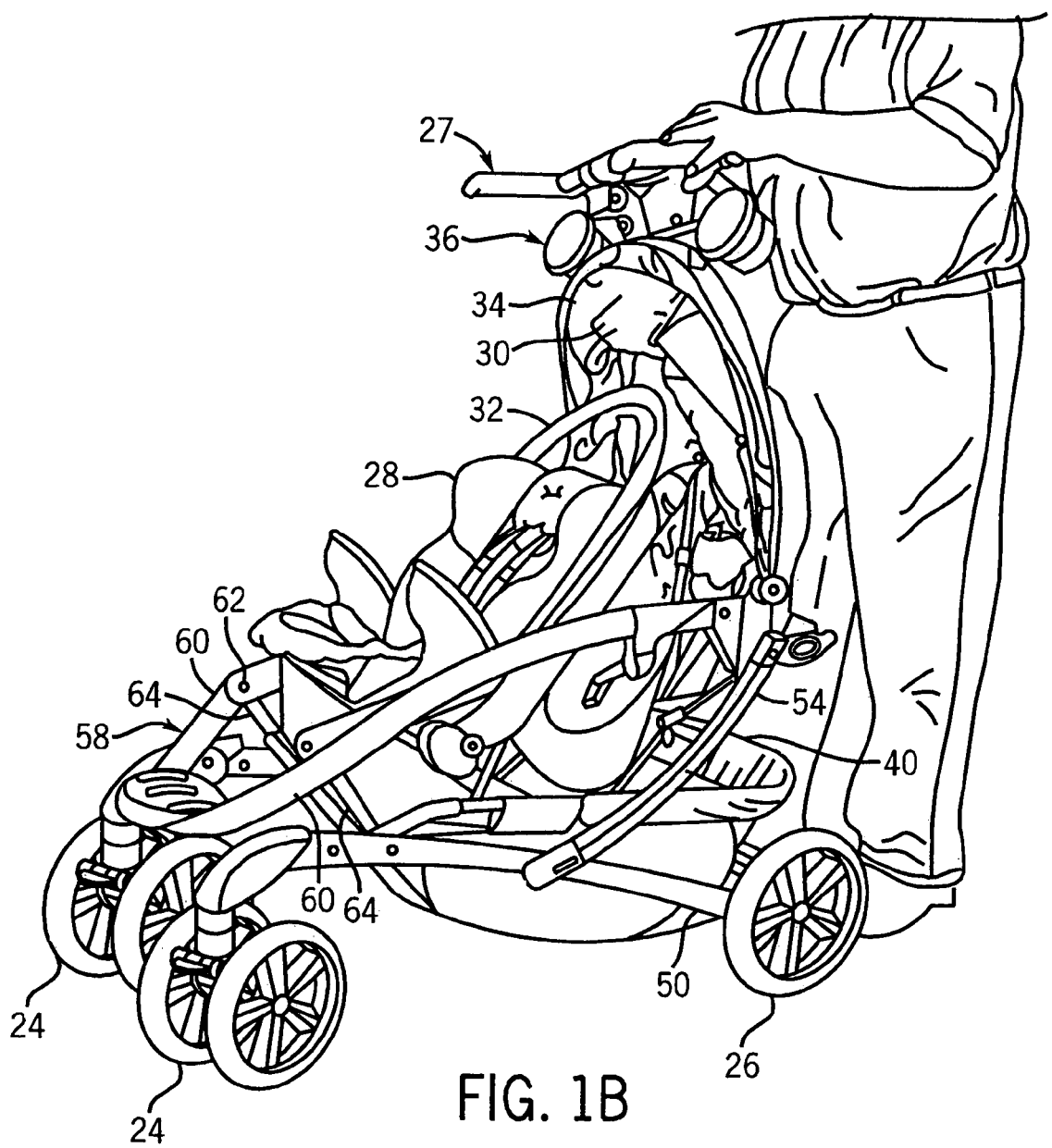
FIG. 1B is a perspective view of the stroller illustrated in FIG. 1 with the cup holders removed as the stroller is folded from the open towards a folded configuration.
Figure 1C:
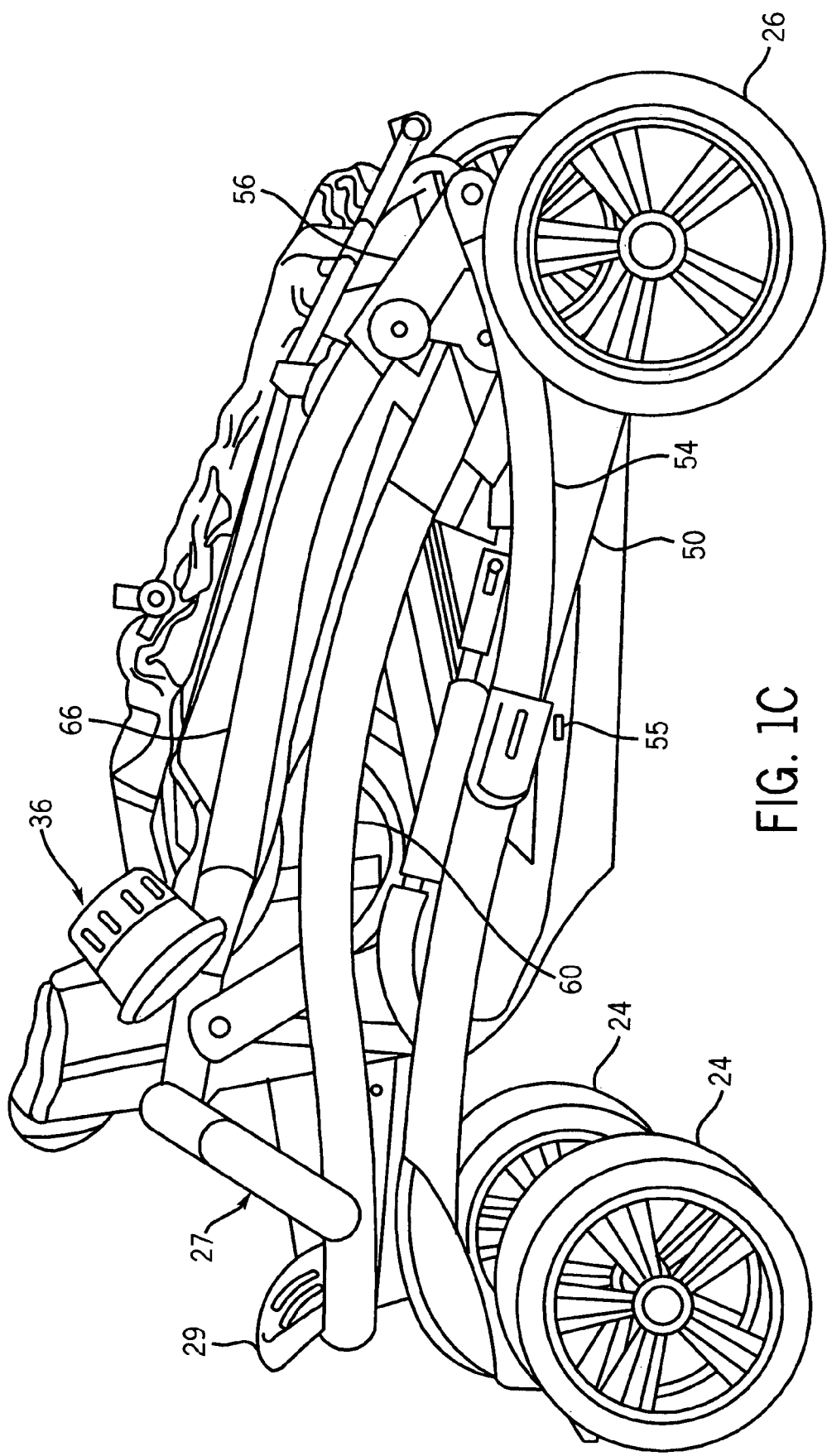
FIG. 1C is a perspective view of the stroller illustrated in FIG. 1 in the folded configuration.

Referring now also to FIGS. 1B and 1C, the latch release handle 76 can be actuated by the user to unlock the latch assembly 56, thereby allowing the stroller 20 to be folded. Specifically, the user articulates the handlebar 27 forward, which causes the push arm 66 to pivot about the latch assembly 56. At the same time, the top of the support struts 54 are rotated rearward, thereby causing the U-shaped support bar 58 to pivot rearward and downward about pivot 62 along the direction of Arrow F (see FIG. 23). As the support bar 58 collapses, the side arms 60 draw the armrests 31 and corresponding child seat 28 to a collapsed position as well. The linkage 64 pivots between pivot joints 67 and 63, and causes the armrests 31 and child seats 28 to pivot rearward about the pivot joint 62. The stroller frame similarly causes child seat 30 to collapse. Folding is simple and easy because the entire stroller drops to the ground without the user having to control the weight of the stroller as it folds. Folding is accomplished with all four wheels on the ground and the rear legs remaining at close to their initial shallow angle. Advantageously, folding the stroller 20 causes the cup holders 38 to retract automatically, as is described below with reference to FIGS. 22-27.

While one exemplary stroller constructed in accordance with the principles of the present invention has been illustrated and described with respect to FIGS. 1A-1C, it should be appreciated that the present invention is not limited to the particular stroller, and that basically any suitable stroller could incorporate the advantages of the present invention. One such stroller is described, for instance, in U.S. patent application Ser. No. 10/397,197 filed Mar. 27, 2003, the disclosure of which is hereby incorporated by reference as if set forth in its entirety herein.

Figure 3:
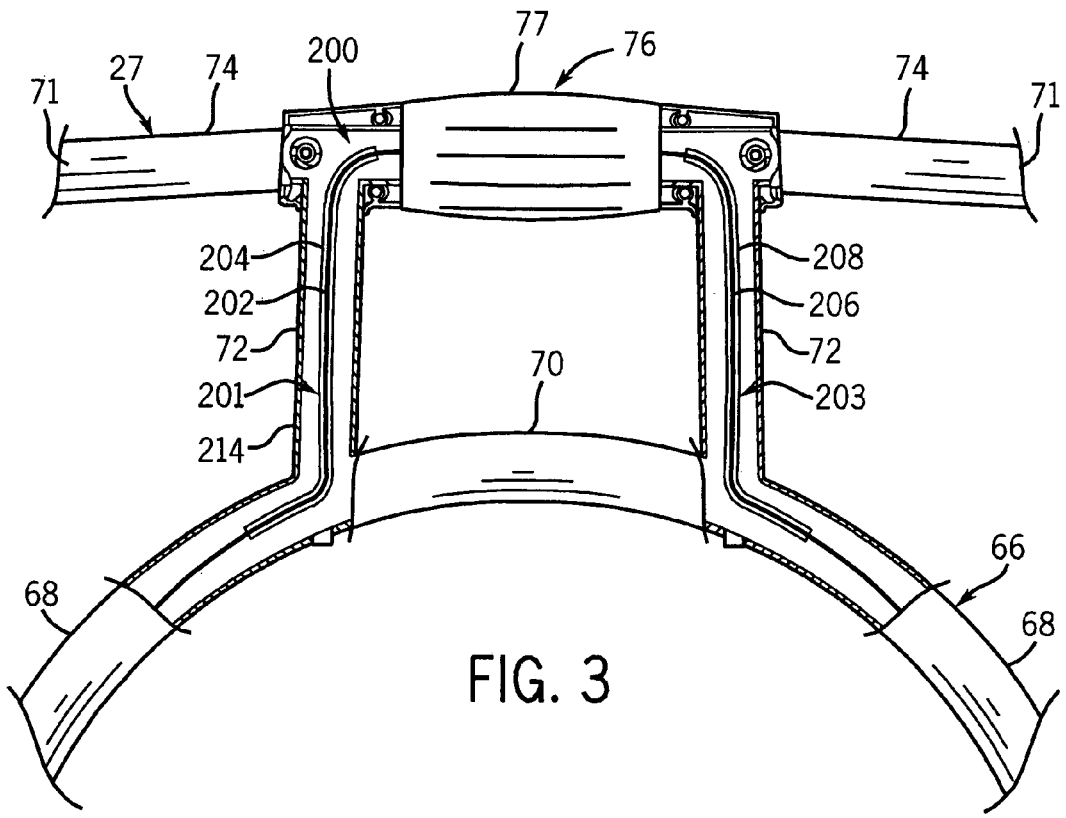
FIG. 3 is a front elevation view of a portion of the stroller frame with portions cut away to illustrate a motion transfer mechanism.

Referring now to FIG. 3, handlebar 27 is illustrated as being connected to the U-shaped section 70 of push arm 66 via a pair of laterally spaced stanchions 72 extending rearward and vertically up from the push arm 66. Specifically, the stanchions 72 are substantially centrally mounted onto the U-shaped section 70. The stanchions 72 are connected to the handlebar 27 such that the latch release handle 76 is disposed between the stanchions 72. Of course, one skilled in the art will appreciate that the scope of the present invention is not intended to be limited to the pair of stanchions 72, and that any number of stanchions can connect the push arm 66 to the handlebar 27. The handlebar 27 extends substantially laterally and has lateral terminal outer ends 71. As described above with reference to FIG. 2B, the handlebar 27 can include auxiliary grips 78 that are connected to outer ends 71. The auxiliary grips 78 extend substantially perpendicular to the grips 74, and can be rotated clockwise and counterclockwise along the direction of Arrow C (FIG. 2B) and locked into the desired position in any known manner. For instance, a pin 79 can be inserted into an aperture disposed in the auxiliary grip 78 and into one of a plurality of radially spaced locating holes (not shown) to locate the angular position of grips 78. Of course, any number of suitable angular adjustment mechanisms known in the art could be employed to facilitate the positional adjustment of the grips 78. The grips 74, 77, and 78 can all comprise a rubber or other elastomeric material, or combination of materials, comfortably engaged by a user.

The stroller frame 22 includes a motion transfer mechanism 200 between the latch release grip 77 and the latch assemblies 56. In the embodiment illustrated in FIG. 3, the motion transfer mechanism is in the form of a first cable assembly 201 including a cable 202 disposed within a corresponding sheath 204, and a second cable assembly 203 including a cable 206 disposed within a corresponding sheath 208. The cable 202 can be formed from any metal wire material, and the sheath can be formed from any elastomeric material that is sufficiently robust to protect the cable 204 within the stroller frame 22. Because the construction and operation of cable assemblies 201 and 203 are similar, and because the construction and operation of the latch assemblies 56 are similar, only the cable assembly 201 is described in detail herein in combination with one of the latch assemblies 56.

Cable assembly 201 is connected at its proximal end to the latch release handle 76, and extends into the stanchion toward the push arm 66. The cable assembly is installed by inserting a tool (not shown) into the open outer end of the handlebar 27. The tool includes an elongated handle and an angled wall at the end of the handle. The tool is inserted such that the wall is placed immediately before the stanchion 72. As the cable assembly 201 is inserted through the handlebar 27, the wall directs the cable assembly down into the stanchion 72. The cable assembly 201 extends down the side arm 68 of the push arm 66, and is connected at its distal end to the latch assembly 56 (see FIG. 12). The present inventors have discovered that the sheath 204 could, but need not be, anchored in the handle 76 and/or at the latch assembly 56. Rather, the sheath 204 extends between the handle and the latch assembly so that it interfaces with a first corner located at the intersection of the handlebar 27 and the stanchion 72, and a second corner located at the intersection of the stanchion 72 and the push bar 66. The interference between the two corners and the sheath 204 provides a sufficient frictional force against the sheath 204 to prevent movement of the sheath during operation. The cable 202 is free to move within the sheath 204 as the handle 76 is actuated. During operation, the user can operate the latch release handle 76, thereby causing translation of the cable 202, which applies an unlocking force onto the latch assembly 56.

Figure 4:
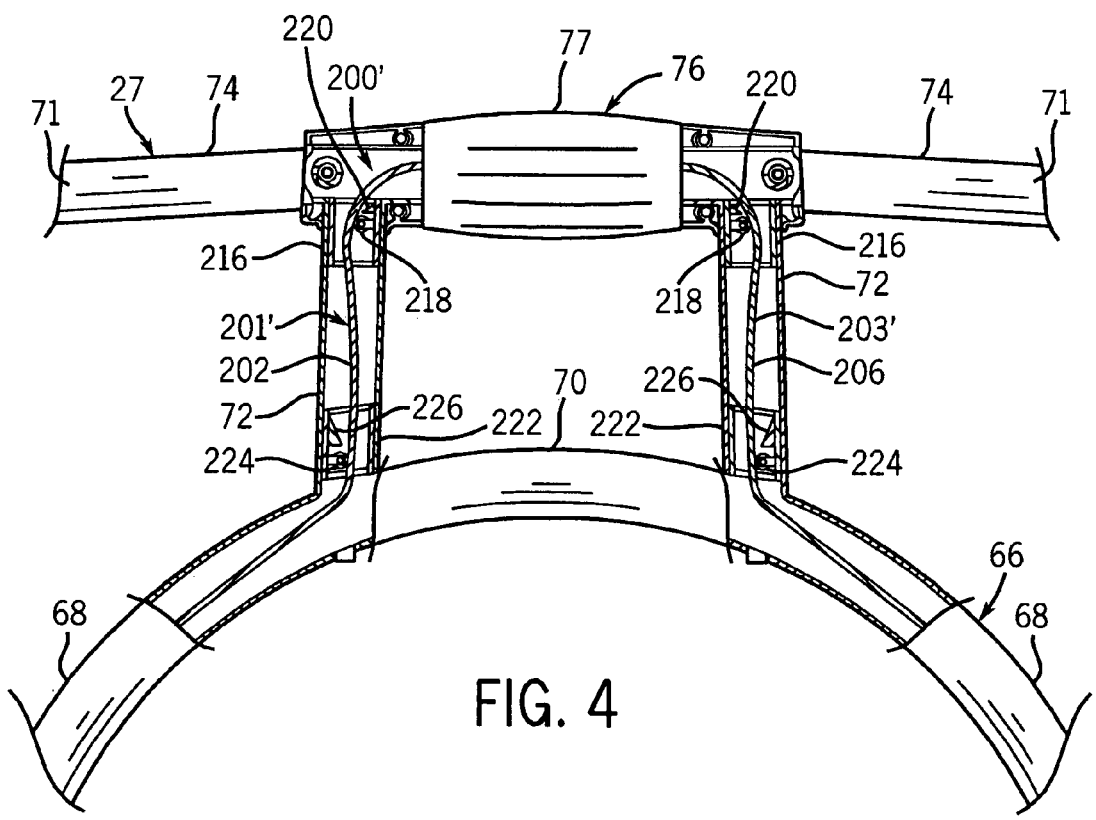
FIG. 4 is a front elevation view of a portion of the stroller frame similar to that illustrated in FIG. 3, but illustrating a motion transfer mechanism constructed in accordance with an alternative embodiment.

It should be appreciated that the motion transfer mechanism 201 illustrated and described with reference to FIG. 3 is only one example of numerous alternative mechanisms, and that all such alternative mechanisms that transfer motion from the latch release handle 76 to the latch assembly 56 are contemplated by the present invention. One such alternative motion transfer mechanism 201' is illustrated in FIG. 4. Specifically, the motion transfer mechanism includes a cable 200' includes cable assemblies 201' and 203' in the form of cables 202 and 204. Because the construction and operation of cable assemblies 201' and 203' are similar, only the cable assembly 201' is described in detail herein. The cable 202 of cable assembly 201' is connected at its proximal end to the latch release handle 76, and extends into the stanchion toward the push arm 66. A cartridge 216 can be installed, for instance inserted axially into the upper end of the stanchion 72 and pressure fit therein, proximal the interface with the handlebar 27. The cartridge 216 includes an internal pulley 218 that is rotatably supported within the cartridge. A wedge 220 is disposed adjacent the pulley 218 and directs the cable 202 over the pulley such that the cable is prevented from rubbing against the corner of the frame 22 at the intersection of the stanchion 72 and the handlebar 27. The cable 202 extends down the stanchion and into a second cartridge 222 that includes an internal pulley 224 that is rotatably supported within the cartridge. Cartridge 222 can be installed into the stanchion, for instance by inserting the cartridge axially into the lower end of the stanchion 72 and pressure fitting the cartridge 222 therein A wedge 226 is disposed adjacent the pulley 224 and directs the cable 202 over the pulley 224 such that the cable 202 is prevented from rubbing against the corner of the frame 22 at the intersection of the stanchion 72 and the push arm 66. The cable 202 extends down the corresponding side arm 68 of the push arm 66 and can be connected to the latch assembly 56 in the manner illustrated in FIG. 12. During operation, the user can operate the latch release handle 76, thereby causing translation of the cable 202, which applies an unlocking force onto the latch assembly 56.

Figure 5:
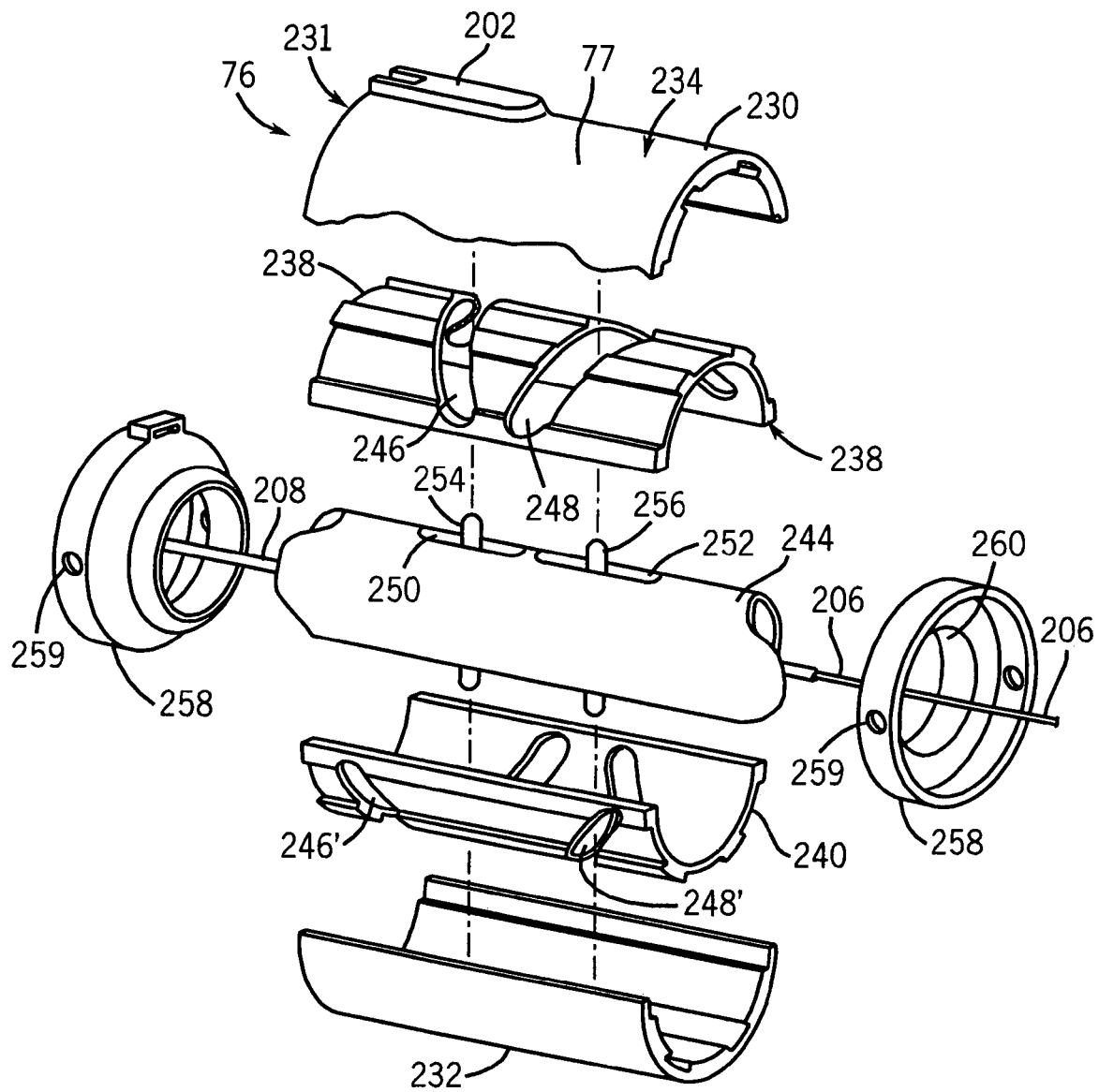
FIG. 5 is an exploded view of the handle assembly illustrated in FIG. 3.
Figure 6:
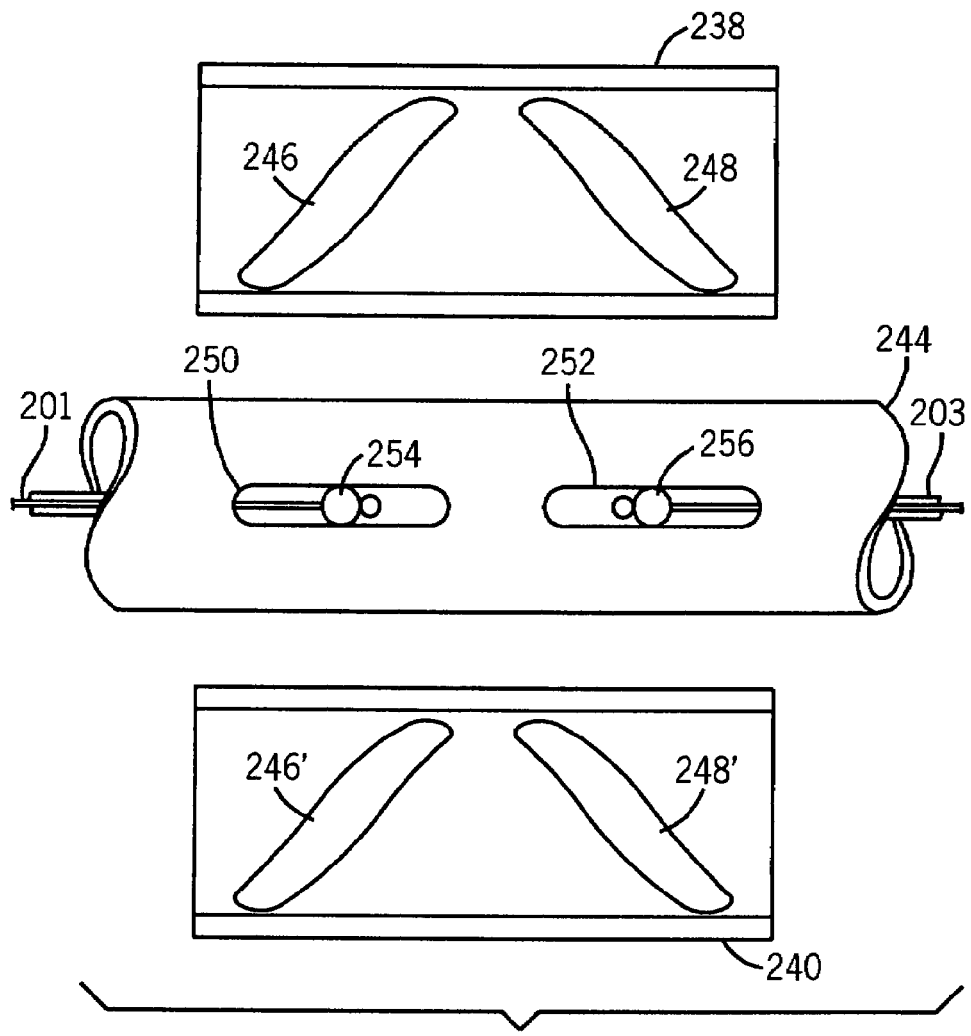
FIG. 6 is an exploded view of a motion conversion assembly that forms a portion of the handle assembly illustrated in FIG. 5.
Figure 7:
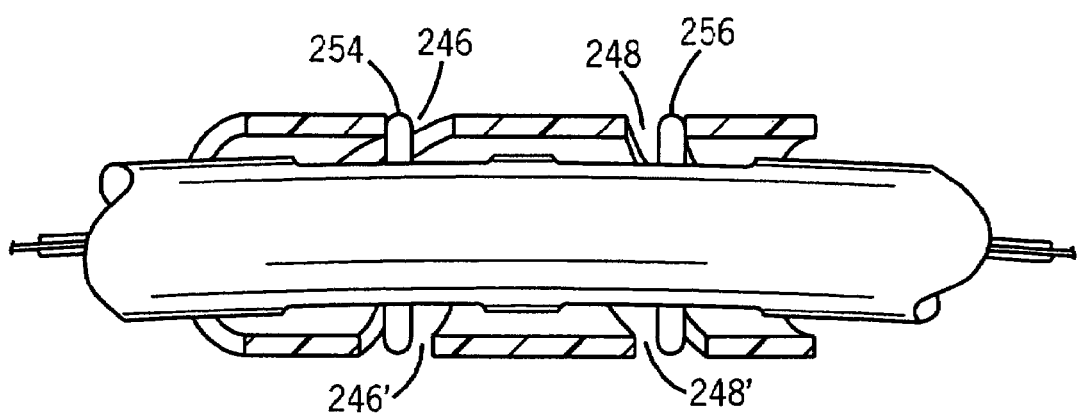
FIG. 7 is a sectional side elevation view of the motion conversion assembly illustrated in FIG. 6.

The latch release handle 76 will now be described with reference to FIGS. 5-7. As illustrated, the latch release handle 76 can have a two-piece construction including generally an outer housing 234 that, as illustrated, includes an outer shell 231 including upper half shell 230 and lower half shell 232. The outer housing 234 provides the gripping surface 77 for the user. The outer housing further includes an inner shell 236 that is disposed radially inward of the outer shell 231. The inner shell 236 includes an upper half shell 238 and a lower half shell 240. In one aspect of the invention, the outer shell 231 can be integrally formed with the inner shell 236. As will be described in more detail below, the inner shell 236 is a motion transfer member that converts radial motion imparted onto the handle 76 by the user into linear motion of the cable assemblies 201 and 203. The outer housing 234 surrounds a central hub 244 and is also concentric to the handlebar 74.

A pair of laterally spaced helical grooves 246 and 248 extends through the upper half shell 238 of the inner shell 236. The grooves 246 and 248 are elongated in a direction that is sloped with respect to the forward-rearward direction, and thus the outer ends of the grooves are laterally offset from each other. Furthermore, the adjacent grooves 246 and 248 are sloped equally and directionally opposite each other. The lower half shell 240 of the inner shell 236 also includes grooves 246' and 248', which are operatively aligned with grooves 246 and 248.

A pair of laterally elongated and laterally spaced slots 250 and 252 extends through the hub 244. Each slot 250 and 252 receives corresponding pins 254 and 256 that extend vertically through the hub 244. The pins 254 and 256 are thus configured for lateral movement within their corresponding slots 250 and 252. Each pin 254 and 256 are connected to the cables 202 and 206, respectively (not shown). The pins 254 and 2156 thus extend through the corresponding slots 250 and 252, and further extend through the corresponding grooves 246 and 246', and 248 and 248', respectively.

A pair of end caps 258 is provided that can be pressure fit in the laterally outer ends of the hub 244 and can interlock or otherwise attach to the hub 244 to prevent circumferential and axial slippage between the end cap 258 and the hub 244. In one aspect of the present invention, the end caps 258 can be mounted to handlebar 27 via a screw or other attachment mechanism that extends through apertures 259 so that the end caps remain stationary during operation, and thus ensure that the outer housing 234 rotates with respect to the stationary hub 244. Each cable 202 and 206 extends through the end caps 258 and is connected to the respective pins 254 and 256.

The grooves 246 and 246' cooperate with pin 254, and grooves 248 and 248' cooperate with pin 256. Specifically, grooves 246 and 246' are constructed such that the pin 254 moves laterally along the length of the slot 250 as the grooves 246 and 246' rotate. As the handle 76 is rotated by an operator, the rotation of the handle causes the grooves 246 and 322 to slide pin 254 axially along the length of the slot 250. Accordingly, the handle 76 converts rotational motion into linear motion and imparts the linear motion onto the cables 202 and 206. When the pin 254 moves along the axial length of tube 244, pin 254 pulls the cable 202 along with it. The motion and force of the wire is then used to release the corresponding latch assembly 56, as is described in more detail below. In a similar manner, grooves 248 and 248' cooperate with pin 256 to slide the pin 256 along slot 252 when the moving member is rotated, thus causing the cable 206 to release the corresponding latch assembly 56.

Figure 8:
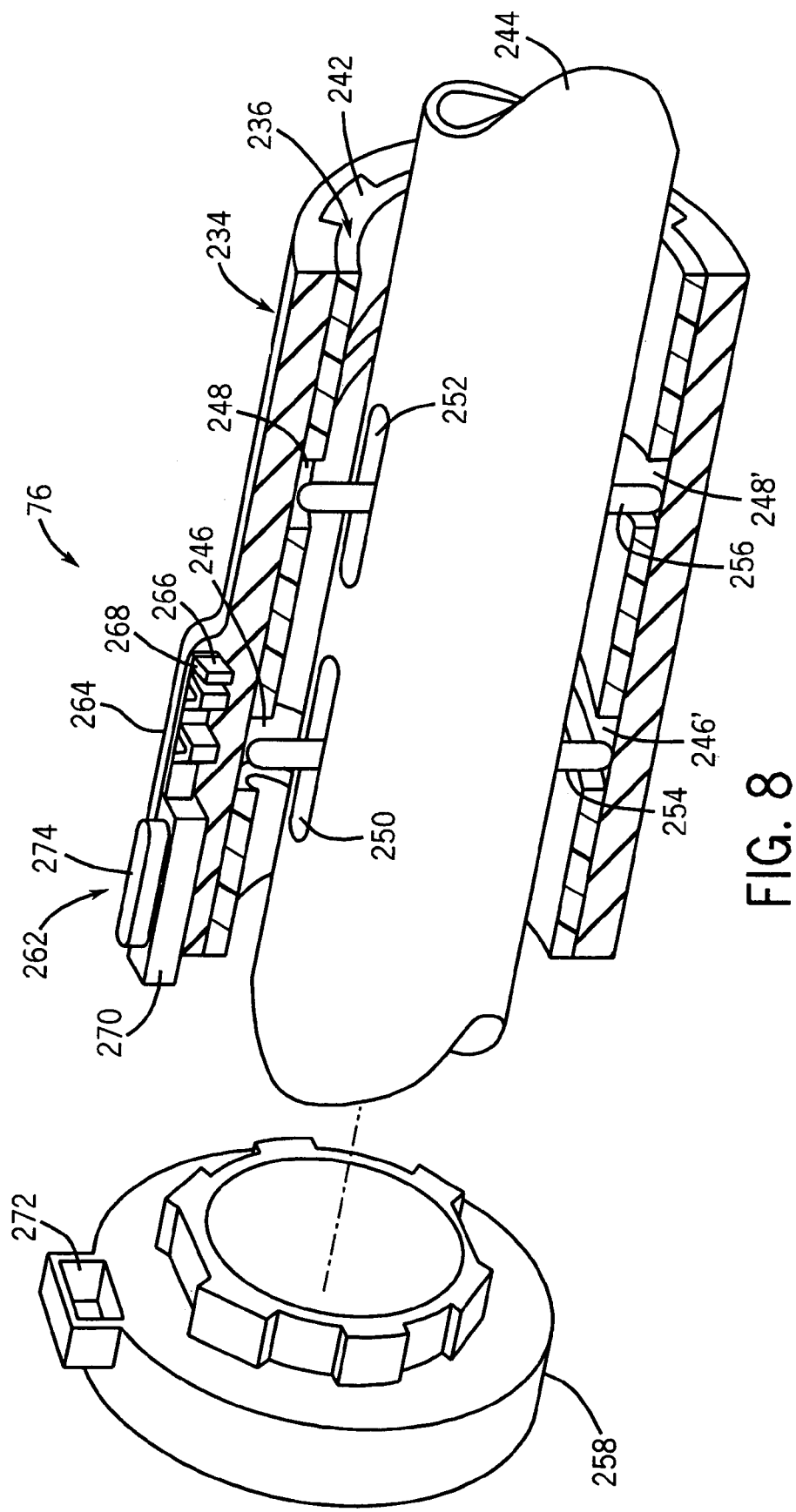
FIG. 8 is a sectional side elevation view of a portion of the handle assembly illustrating a locking mechanism.
Figure 9:
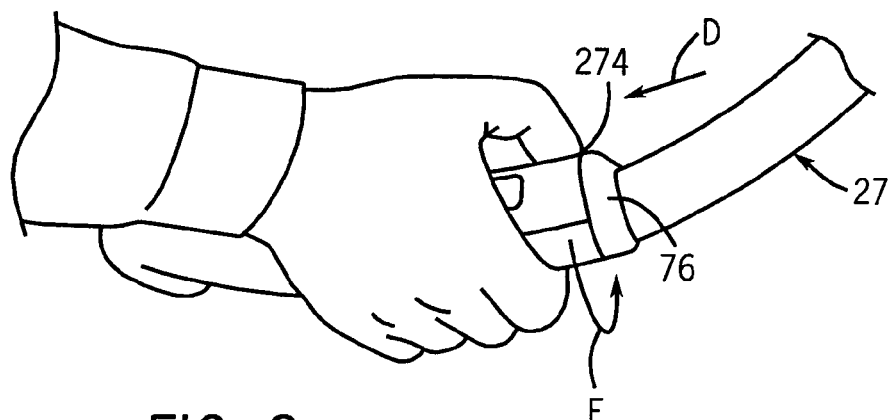
FIG. 9 is a perspective view schematically illustrating the operation of the handle assembly.

Referring now to FIGS. 8-9, one of the end caps 258 includes a rotation lock 262 that is operable to prevent rotation of the handle 76 when engaged. Specifically, a substantially rectangular housing 264 extends out from the housing proximate to one of the lateral ends of the housing, and retains an inwardly projecting seat 266. A spring 268 extends between the seat 266 and a laterally extending latch 270 also disposed in the housing 264. The end cap 258 includes a pocket 272 that is in radial alignment with the latch 270. The pocket 272 is in angular alignment with the latch 270 when the handle 76 is disposed in the neutral position such that the latch assembly 56 is in the locked position. The latch 270 extends laterally out from the housing 264 and is configured to extend into the pocket 272. Accordingly, the latch 270 interlocks the outer housing 234 with the end cap 258 and prevents the housing 234 from rotating. An actuator 274 is coupled to the latch 270 and projects out of the housing 234, and is thus accessible to the user.

During operation, the spring 268 biases the latch 270 into the pocket 272. When the user wishes to fold the stroller 20, the user translates the actuator 274 away from the end cap 258 along the direction of Arrow D, thereby removing the latch from interference with the pocket and allowing the handle 76 to rotate along the direction of Arrow E. Once the user releases the actuator 274, the spring 268 again biases the latch 270 towards the end cap 258. If the handle 76 is in the neutral position, the latch 270 will extend into the pocket 272 and lock the handle 76 with respect to rotation. The construction and operation of the handle 76 is further described in U.S. Pat. No. 6,068,284, the disclosure of which is hereby incorporated by reference as if set forth in its entirety herein.

The construction and operation of the latch assembly 56 will now be described with reference to FIGS. 10-13. Specifically, each latch assembly 56 includes an outer housing 300 that partially receives an inner housing 302. The outer and inner housings 300 and 302, respectively, can be molded of a plastic material, such as nylon 6.

The outer housing 300 includes a lower longitudinally elongated cavity 308 and a pair of laterally spaced vertical flanges 310 extending up from the cavity 308. A first tube 304, which can be attached to the side arm 68 of push arm 66, or could be integrally connected to the side arm 68, is received inside the cavity 308 of the outer housing 300. The inner housing 302 includes a body 307 sized to fit between the vertical flanges 310. The housing body 307 defines a longitudinally elongated socket 312 that generally closely conforms to the profile of the upper end of the side arm 60. The socket 312 receives a second tube 306, which can be attached to the side arm 60 of support arm 58, or could be integrally connected to the side arm 60. One end of the inner housing 302 that interfaces with the outer housing 300 includes a pivot portion 314 having a centrally disposed rivet hole 316 extending therethrough and aligned with a pair of aligned rivet holes 320 (one shown) extending laterally through the upper ends of the flanges 310 of outer housing 300. The rivet holes 316 and 320 define a pivot axis 318. When the latch assembly 56 is unlocked, the inner and outer housings 300 and 302 are pivotable with respect to each other about the pivot axis 318.

The upper end of the side arm 60 necks down so that it fits within the latch assembly 56. FIG. 13 illustrates the necked-down or "crushed" cross-section 315 of the upper end of the side arm 60, or tube 306, in which a longitudinal crease 319 effectively folds the lower portion of the tube up into itself. Thus socket 312 narrows from an entry 322 with an oval cross-section that matches the full oval cross-section of the front leg, to a domed and flat-bottomed cross-section 324. The rivet hole 316 receives the rivet 326 that joins the outer housing 300 and inner housing 302 together through holes 320, 316 and anchors the front leg in the socket 312.

The inner housing 302 further includes a receiver 327 disposed below socket 312. The receiver 327 has a mouth 330 that defines inwardly extending opening having an outer lip 332. The mouth 330 is aligned with the lower longitudinally elongated cavity 308 of outer housing 300. A retractable plunger 334 defines one end that is housed in the cavity 308 of outer housing 300. The other end of the plunger 334 is received by the lip 332 and mouth 330 of inner housing 302. The plunger 334 can be molded of acetal resin, i.e., polyoxymethylene, or "POM." The plunger 334 is substantially shrouded by latch housings 300 and 302 so as to be protected from dust and dirt. Alternatively, the plunger 334 could be sized and shaped to nest within tube 304 within the latch assembly 56.

The plunger 334 slides within the cavity 308, guided by the end of the tube 304 that it surrounds. The tube 304 is anchored to outer housing 300 by a rivet 336 through hole 341 formed in tube 304 and further through a hole 339 extending through outer housing 300. The rivet 336 further passes through a pair of elongated slots 338 in the sides of plunger 334. The engagement between the rivet 336 and slots 338 guides and limits the movement of the plunger 334 within the latch assembly 56. A helical spring 340, captured between the plunger 334 and a shoulder 342 (or alternatively a rivet) disposed within cavity 308, biases the plunger 334 outward, toward the receiver 327.

The housing 302-facing end 344 of the plunger 334 has a sloped face with a hole 346 and a notched cable-and-ball anchoring recess 348. The cable 202 extends through the handle from latch release handle 76 as described. The cable 202 extends through the interior of plunger 334 and through hole 346, and has a ball end 350 anchored in recess 348.

Referring now to FIG. 12 in particular, the latch assembly 56 is in a locked position, whereby a portion of the plunger 334 is retained in the mouth 330 of receiver 327. When the grip 76 is rotated, cable 202 retracts plunger 334 against the spring force until its distal end clears lip 332 (i.e., to the dashed line position shown in FIG. 12). The user can then pivot the handlebar 27 as illustrated in FIG. 9 to fold the stroller 20.

Figure 10:
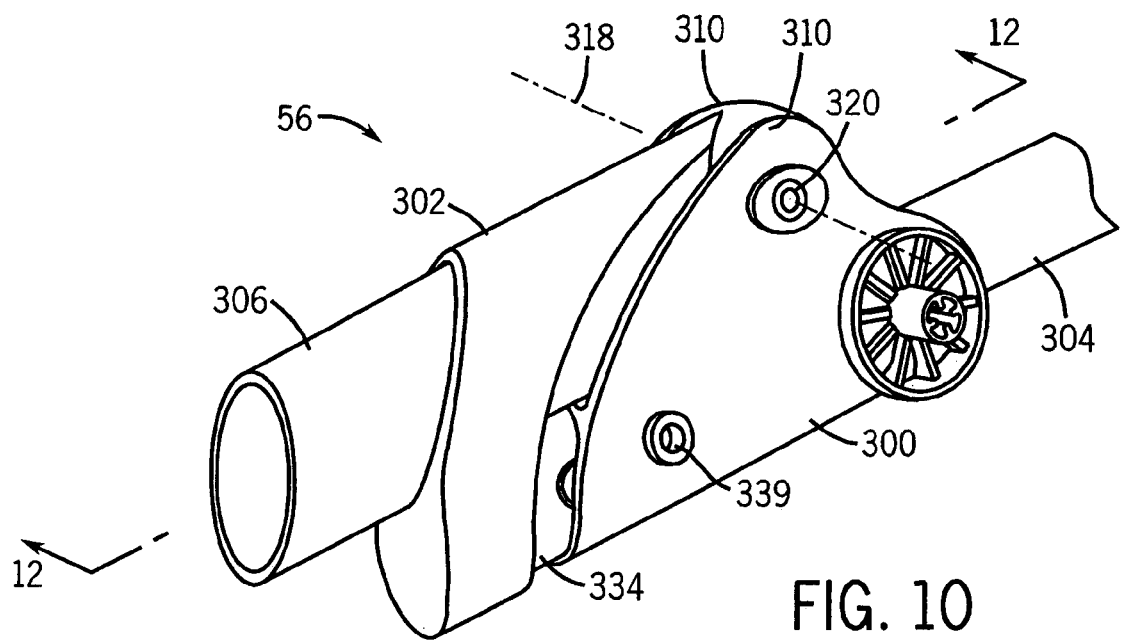
FIG. 10 is a side elevation view of a portion of the stroller frame illustrating a latch assembly.
Figure 11:
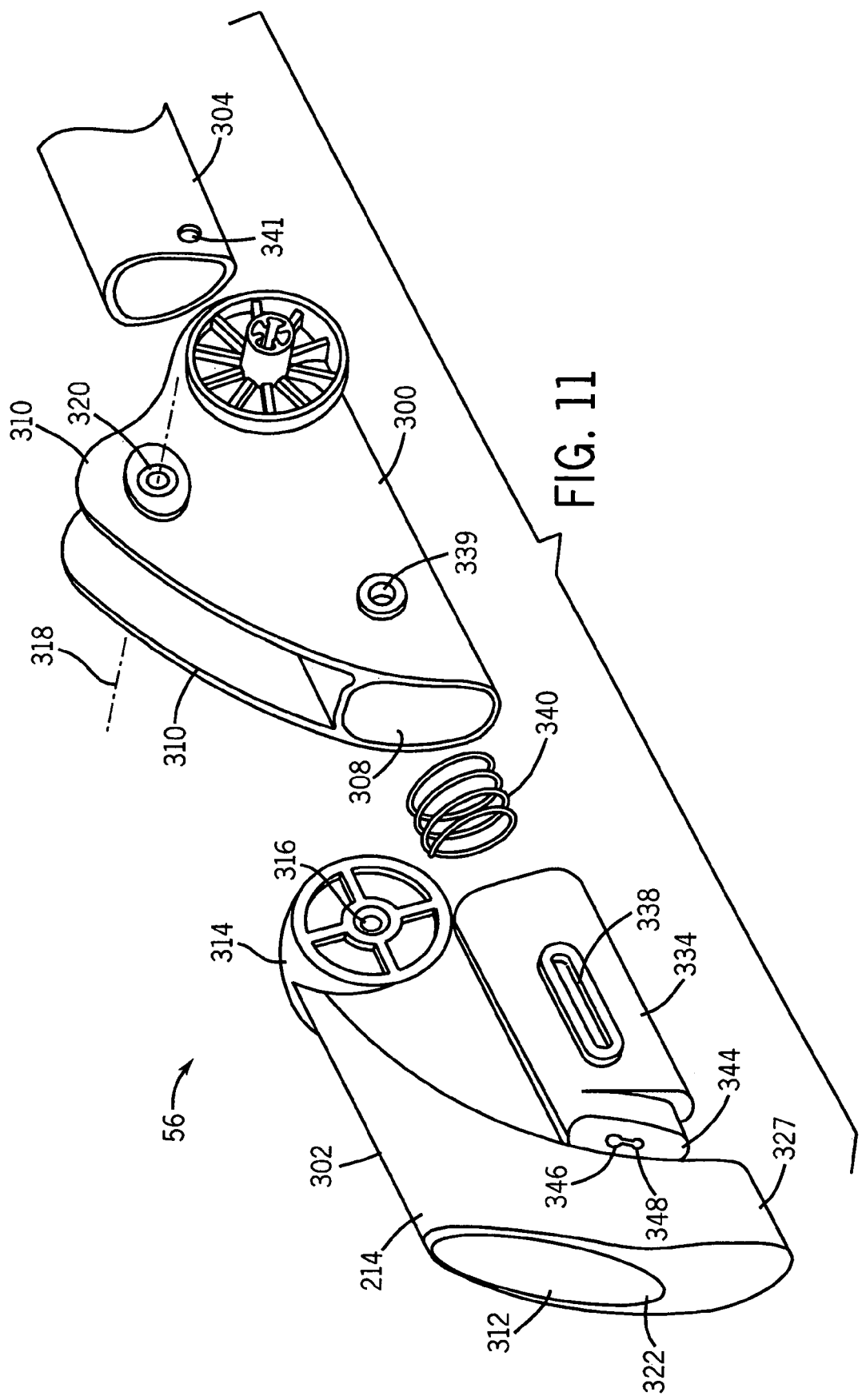
FIG. 11 is an exploded assembly view of the latch assembly illustrated in FIG. 10.

When the stroller 20 is to be opened from the folded position, tube 304 is rotated relative to tube 306 toward the position illustrated in FIG. 10. When the end 344 of plunger 334 meets lip 332, the sloped face of the plunger 334 provides a cam surface that pushes the plunger further into the cavity 308 against the force of spring 340. When the tip of the plunger 334 clears the lip 332, the spring forces the plunger 334 into the mouth 330 to lock the frame in the open position. The construction and operation of latch assembly 56 is further described in U.S. Pat. No. 7,188,858, the disclosure of which is hereby incorporated by reference as if set forth in its entirety herein.

Figure 14:
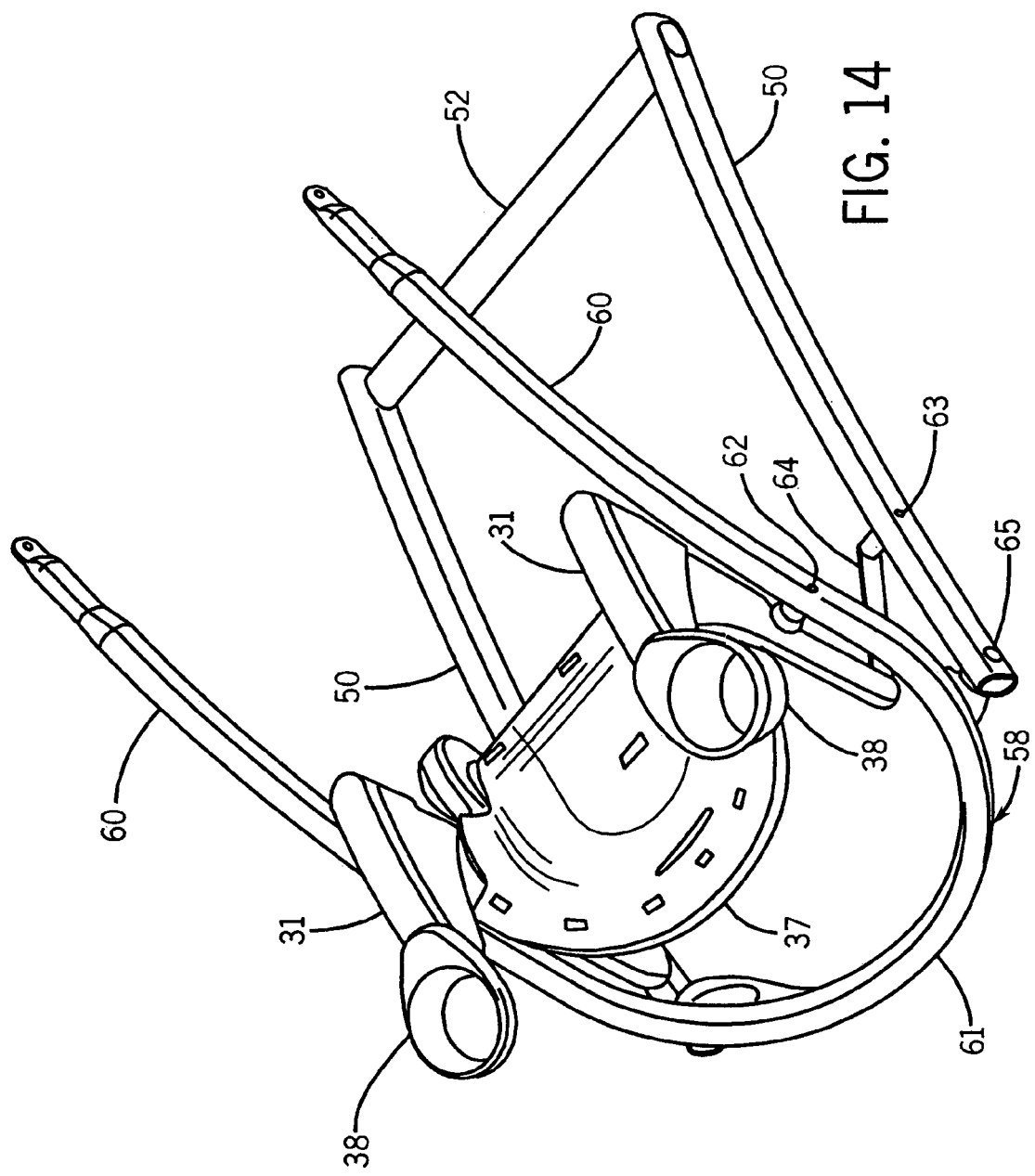
FIG. 14 is a perspective view of a portion of the stroller illustrated in FIG. 1 showing the connection of a pair of cup holders to the stroller frame when the stroller frame is in its open configuration.
Figure 15:
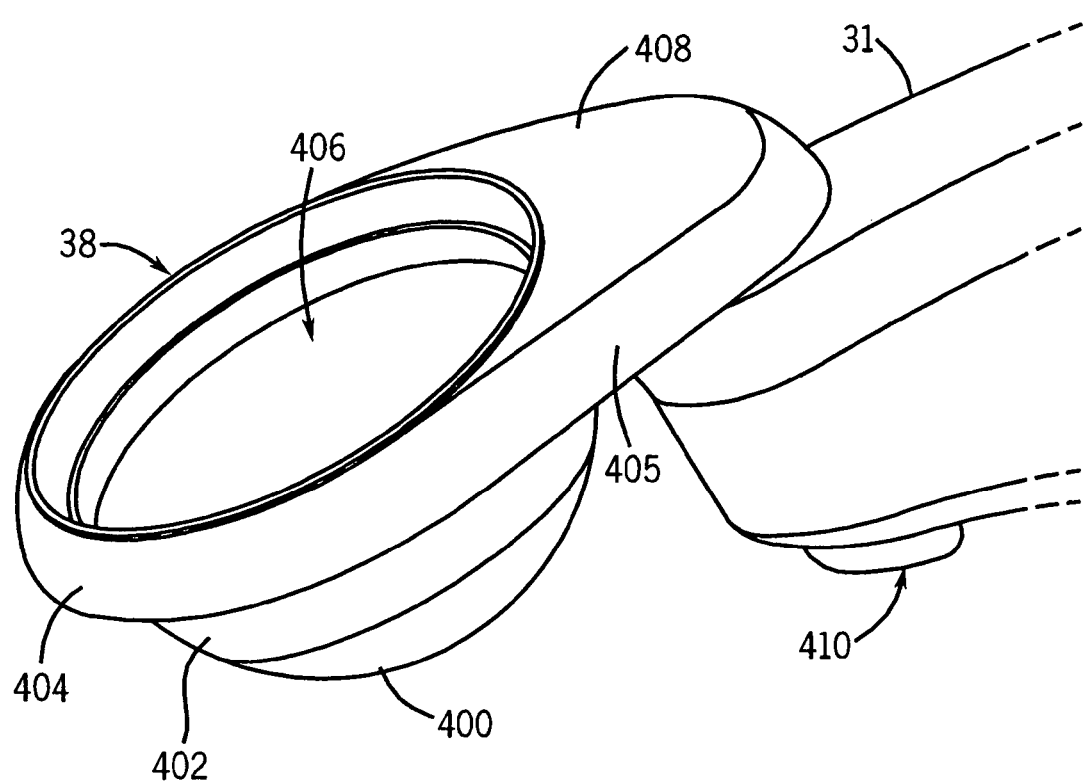
FIG. 15 is a perspective view of one of the cup holders illustrated in FIG. 14 connected to an armrest.

Referring now to FIG. 14-15, the cup holders 38 are illustrated as extending upward and forward from the forward end of the upper surface of the armrest 31 when in the extended position. The cup holders 38 can be constructed in any manner known to one skilled in the art so long as they are capable of storing an item, for instance a beverage. As illustrated, each cup holder 38 includes a round base 400 connected at its upper end to an annular body member 402 extending up from the base 400. The annular body 402 can also extend radially out from the base 400 if desired. A radial flange 404 is connected to the upper end of the annular body 402, and in combination with the base 400 and annular body 402, defines an interior void 406 sized and shaped to retain an item, such as a beverage container.

The flange 404 further includes a seat 408 at its proximal end that extends horizontally to a location that overlaps with the upper surface of armrest 31. The flange 404 presents a curved outer surface 405 having a horizontal width that increases in a direction from the proximal end towards the void 406. The seat 408 extends above the forward end of the armrest 31, and a biasing assembly 410, illustrated as a pivot assembly, extends down from the seat 408 and into the armrest 31, thereby connecting the cup holder 38 to the armrest 31. Advantageously, the pivot assembly 410 allows the cup holder 38 to automatically pivot between the extended position and a retracted position when the stroller frame 22 is open and folded, respectively, as will now be described.

Figure 16:
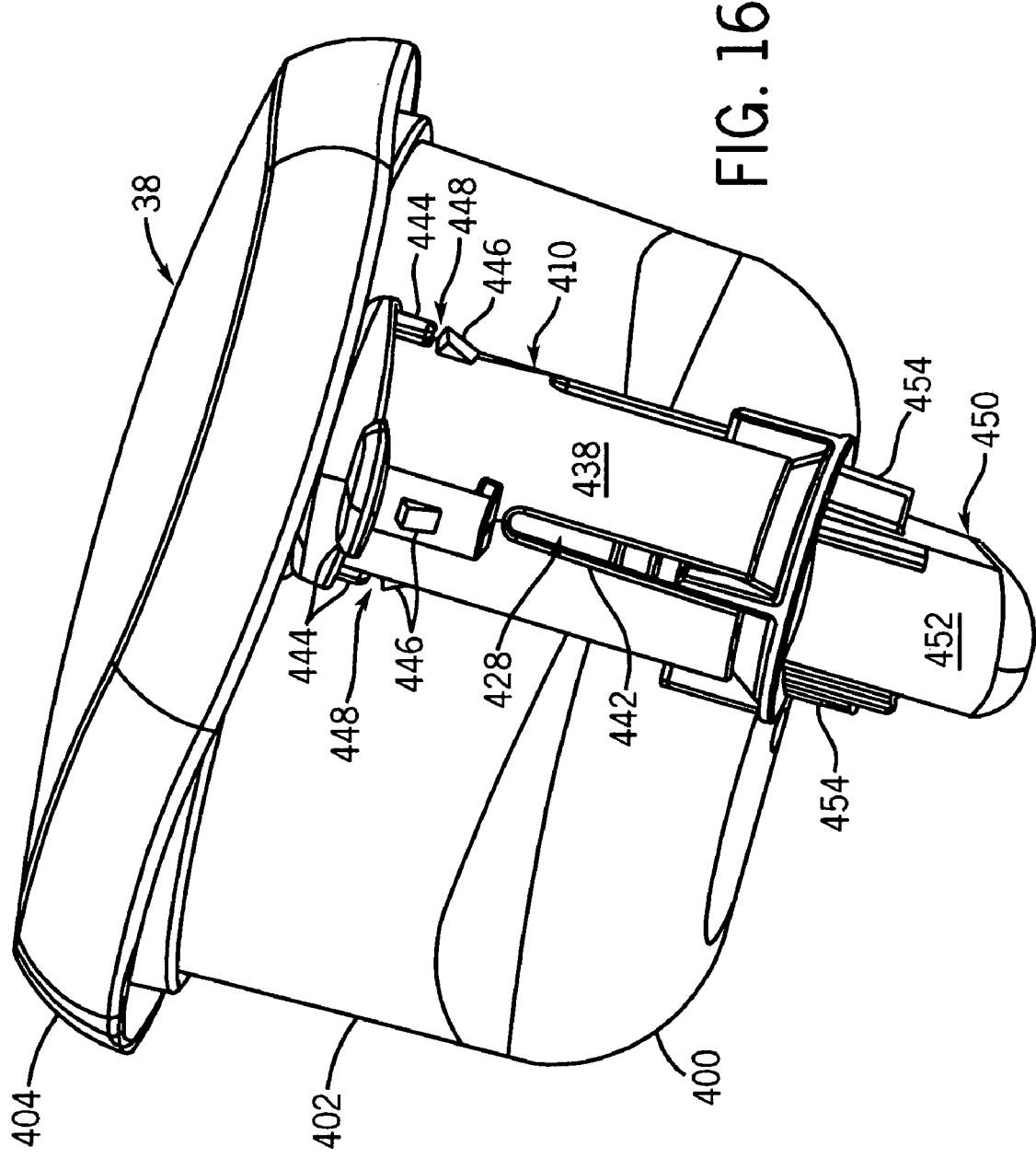
FIG. 16 is a perspective view of the cup holder illustrated in FIG. 15 including a pivot assembly.
Figure 17:
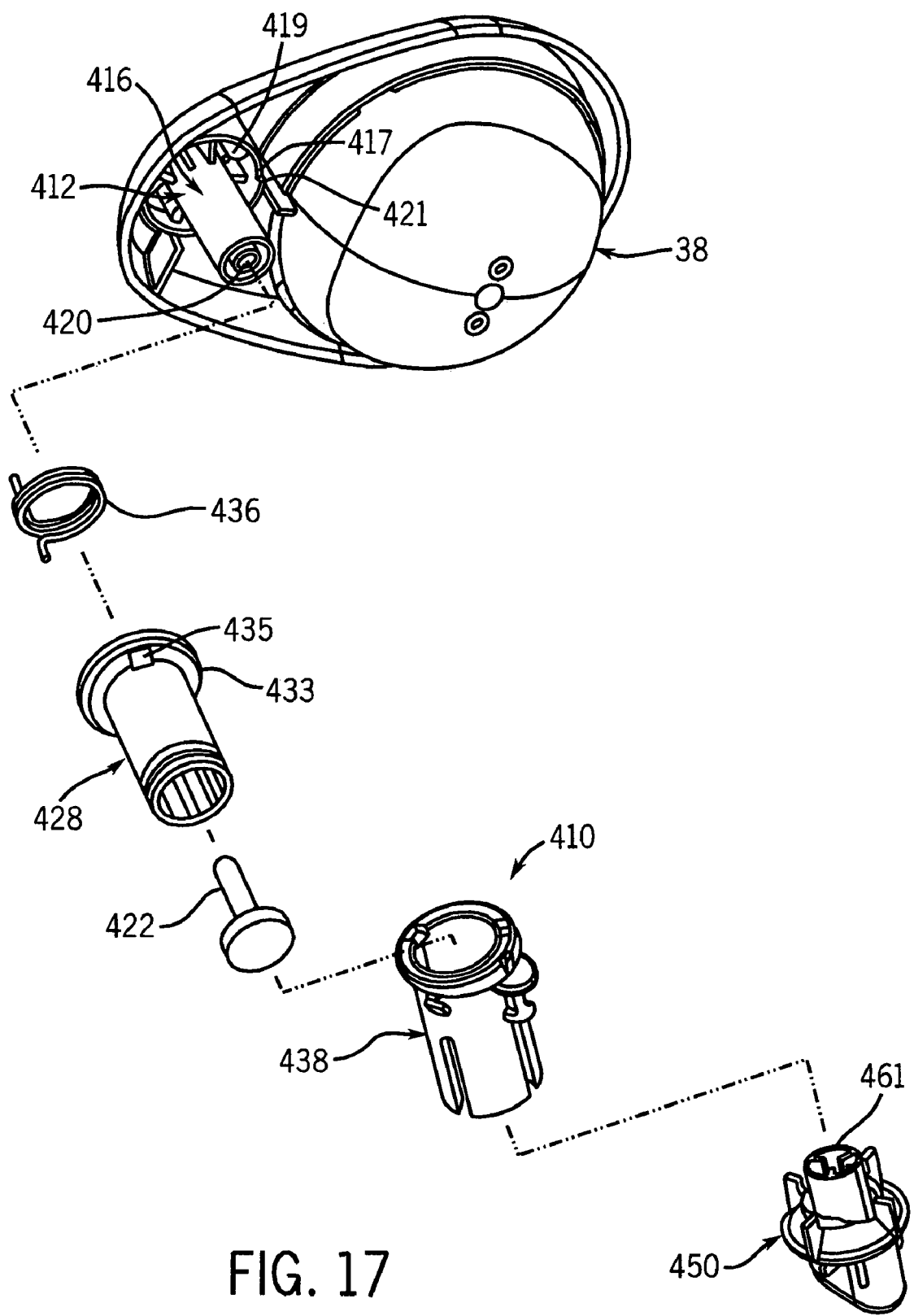
FIG. 17 is an exploded assembly view of the pivot assembly illustrated in FIG. 16.
Figure 20:
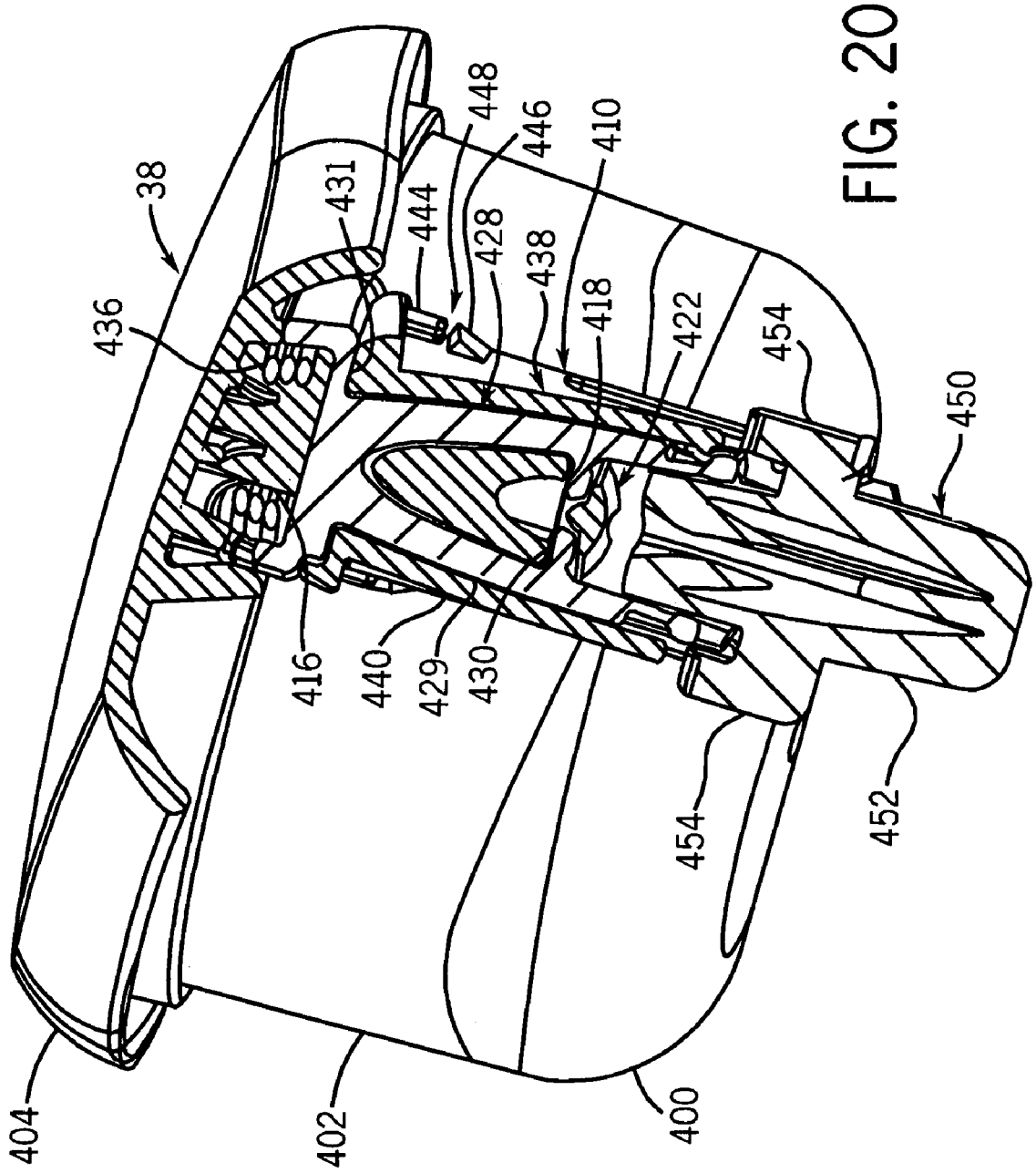
FIG. 20 is a sectional side elevation view of the pivot assembly illustrated in FIG. 16.

Referring to FIGS. 16-17 and 20, a stem 416 extends down from the lower surface of flange seat 408. A shroud 417 surrounds the upper portion of stem 416. A boss 419 extends from the radial inner surface of shroud 417, and defines a hole extending vertically therethrough. A locating tab 421 extends down from the lower end of the shroud 417. The stem 416 defines a substantially horizontally flat lower surface 418, and a bore 420 extends centrally up from the lower surface 418.

Figure 18A:
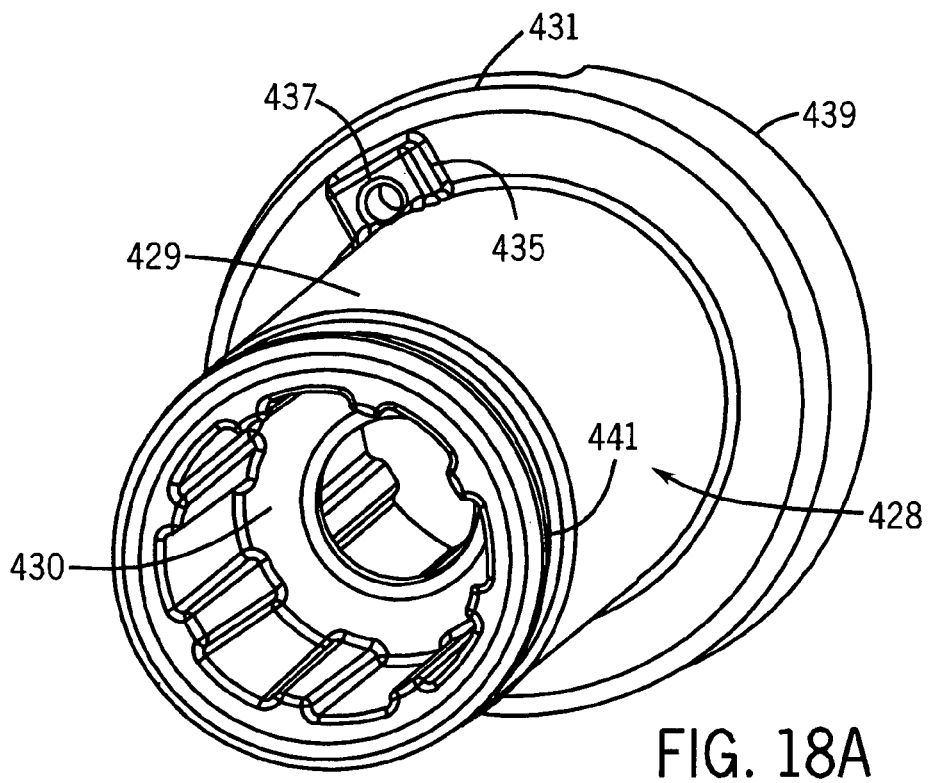
FIG. 18A is a bottom perspective view of a sleeve forming part of the pivot assembly illustrated in FIG. 17.
Figure 18B:
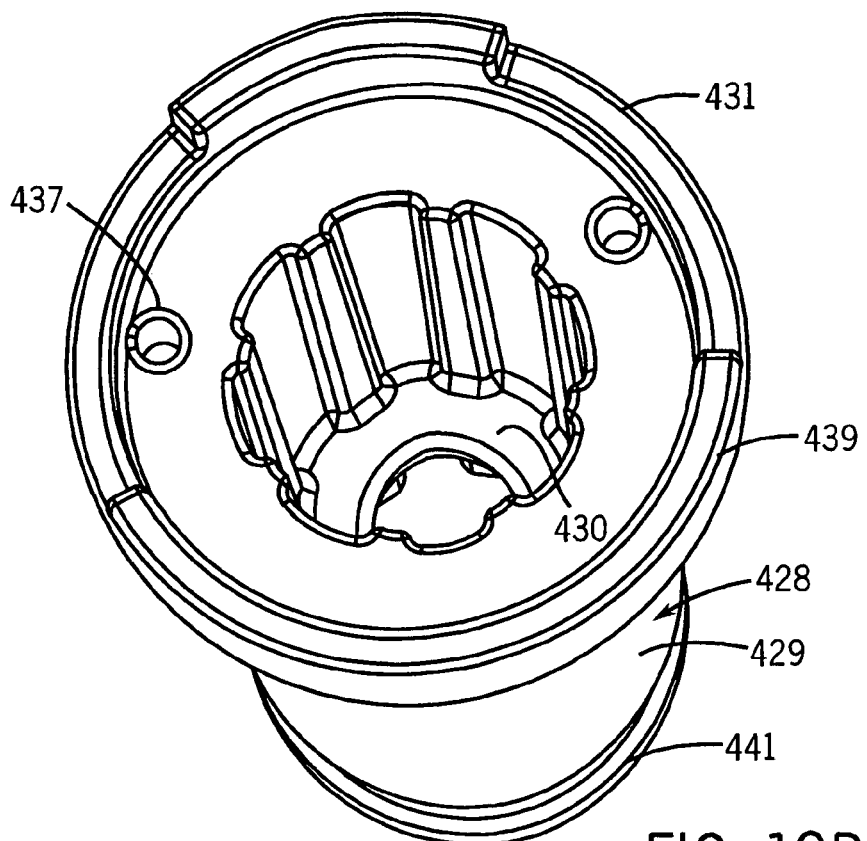
FIG. 18B is a top perspective view of the sleeve illustrated in FIG. 18A.

Referring also to FIGS. 18A-18B and 20, the pivot assembly 410 includes an inner sleeve 428 having an extending inner vertical annulus 429 that surrounds the stem 416. A flange 430 projects radially inwardly from the inner sleeve 428 and provides a seat for a screw 422 that extends into the lower end of sleeve 428 through the upper end of the sleeve 428 and is threadedly received in the lower end of the bore 420 formed within stem 416. Because the screw 422 extends through the sleeve 428 and is not threadedly received within sleeve, the stem 416 and the sleeve 428 are rotatable with respect to each other. The sleeve 428 includes an upper radial flange 431 extending out from the upper end of annulus 429.

A first tab 435 extends down from flange 431 and defines a hole 437 extending vertically through. A biasing member in the form of a torsion spring 436 surrounds the upper end of the stem 416, and defines one free end that extends through the hole defined by boss 419. The opposing free end of the spring 436 extends through the hole 437 defined by tab 435. The spring 436 provides a spring force that imparts a rotational biasing force against the hub 412, and therefore the cup holder 38, with respect to the inner sleeve 428. The spring force therefore biases the cup holder 38 to rotate radially outwardly about the inner sleeve 428 toward its normally extended position illustrated in FIG. 14. A second tab (not shown) is provided opposite the first tab 435, but does not define a hole.

The sleeve 428 further defines a tab 439 extending vertically upward from a portion of the radial flange 431. The tab 439 is in radial alignment with the locating tab 421 of stem 416. As a result, the biasing force of spring 436 causes the stem 416 to rotate radially outward with respect to the sleeve 428 until the tabs 439 and 421 contact, thereby locating the fully extended position of the cup holder 38. A radial notch 441 extends into the lower end of annulus 429.

Figure 19:
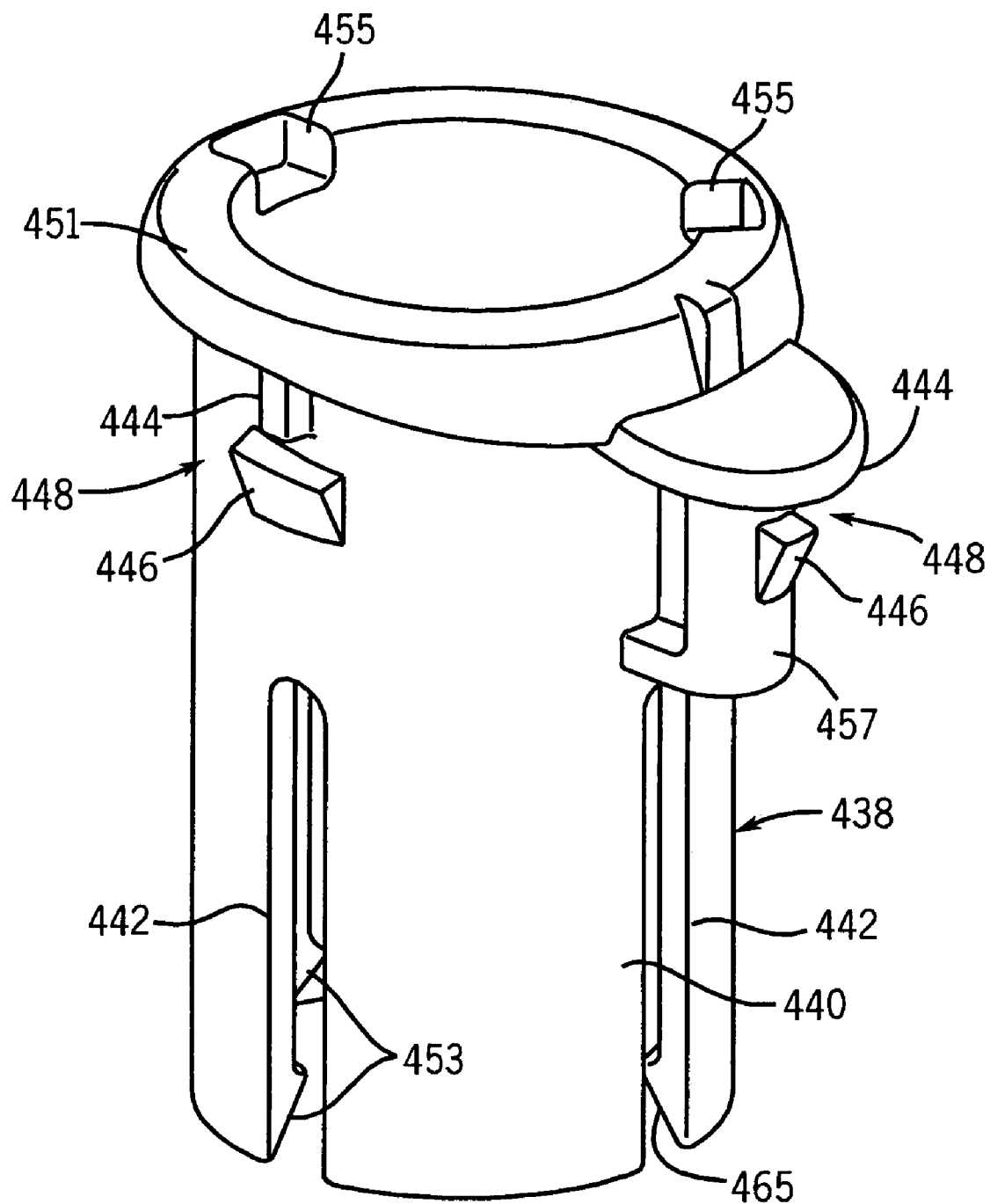
FIG. 19 is a perspective view of a collar forming part of the pivot assembly illustrated in FIG. 17.
Figure 21:
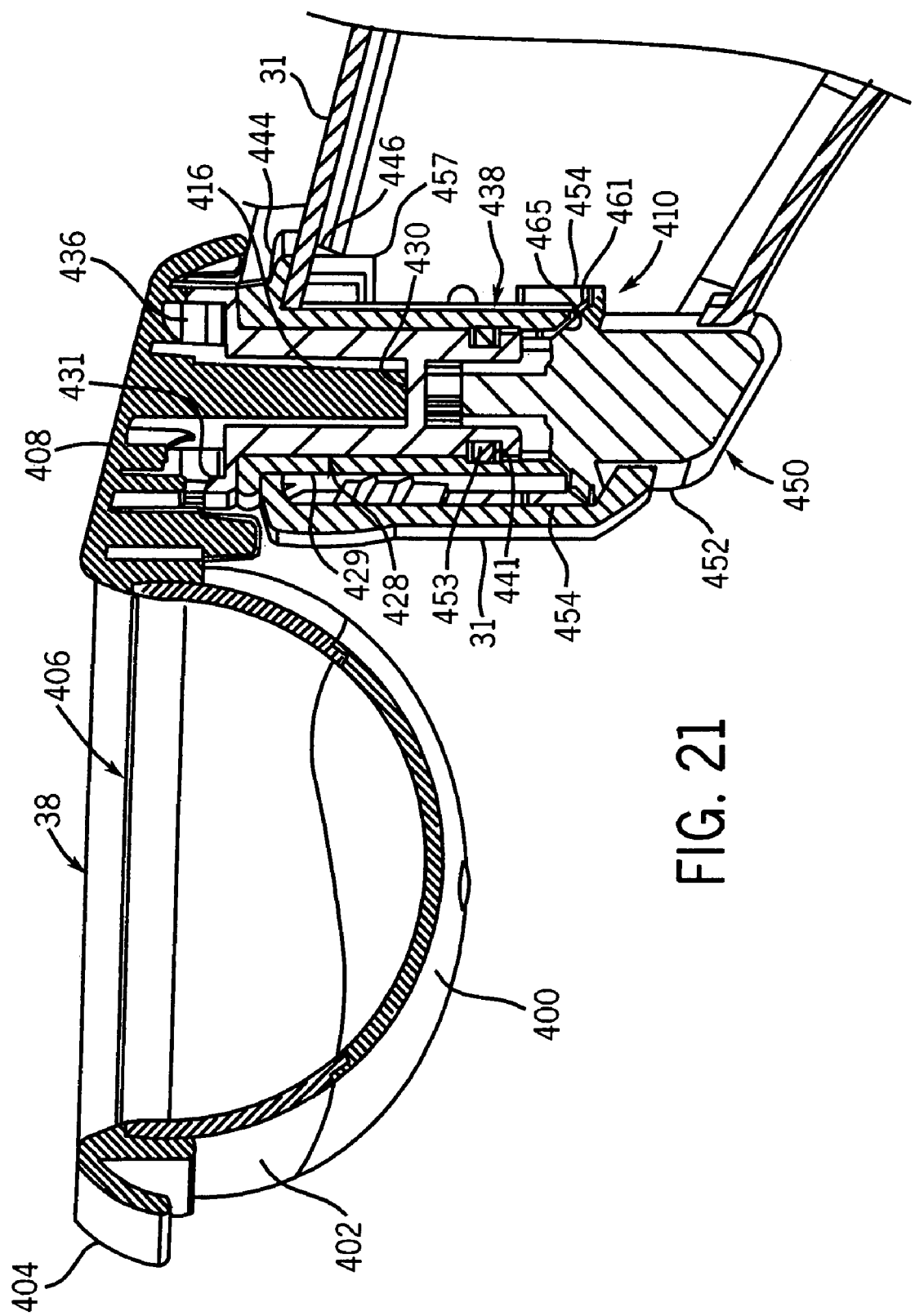
FIG. 21 is a sectional side elevation view similar to that illustrated in FIG. 18, but with portions cut away and illustrating the pivot assembly connected to an armrest.
Figure 22:
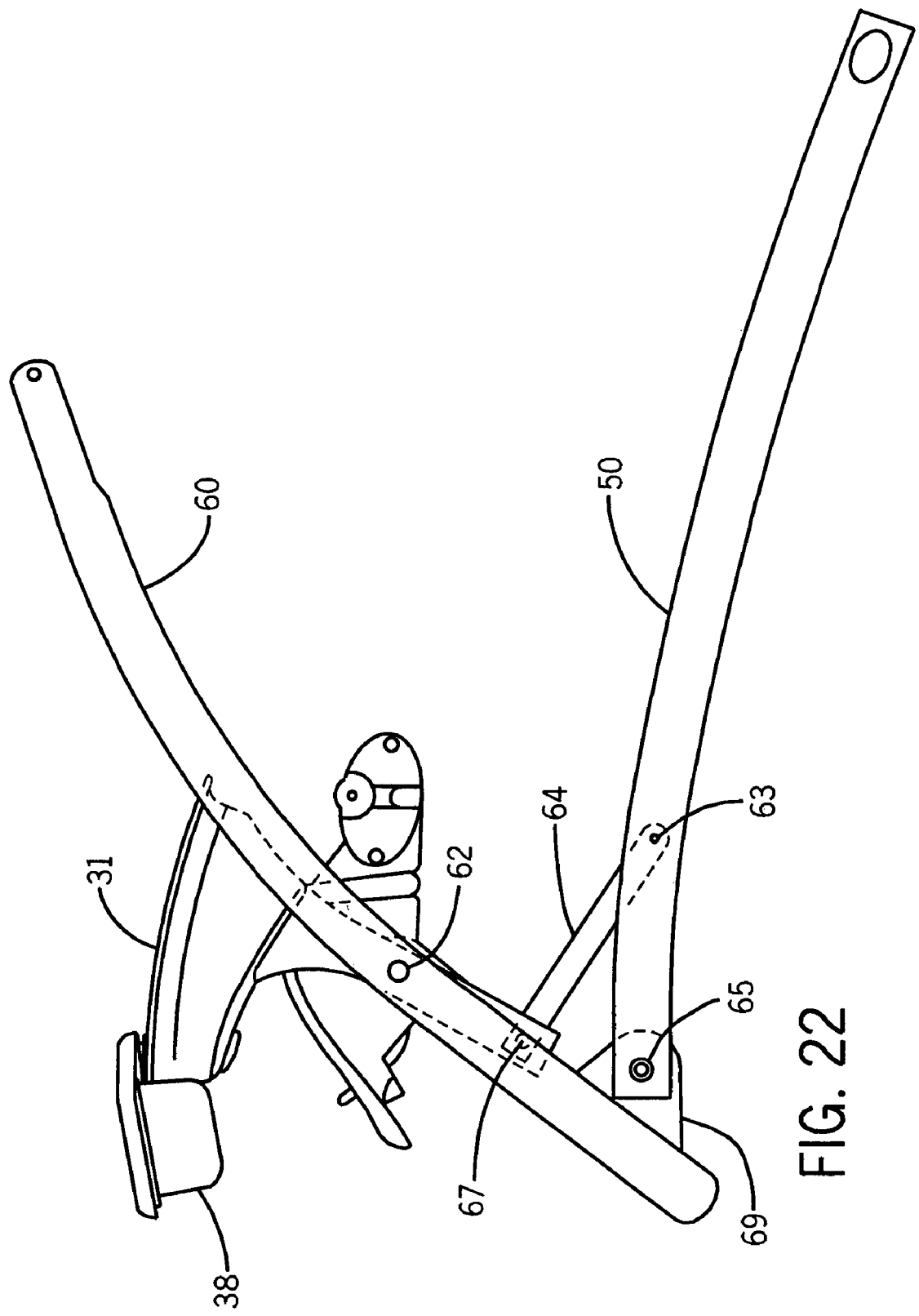
FIG. 22 is a side elevation view of the portion of the stroller illustrated in FIG. 14.
Figure 23:
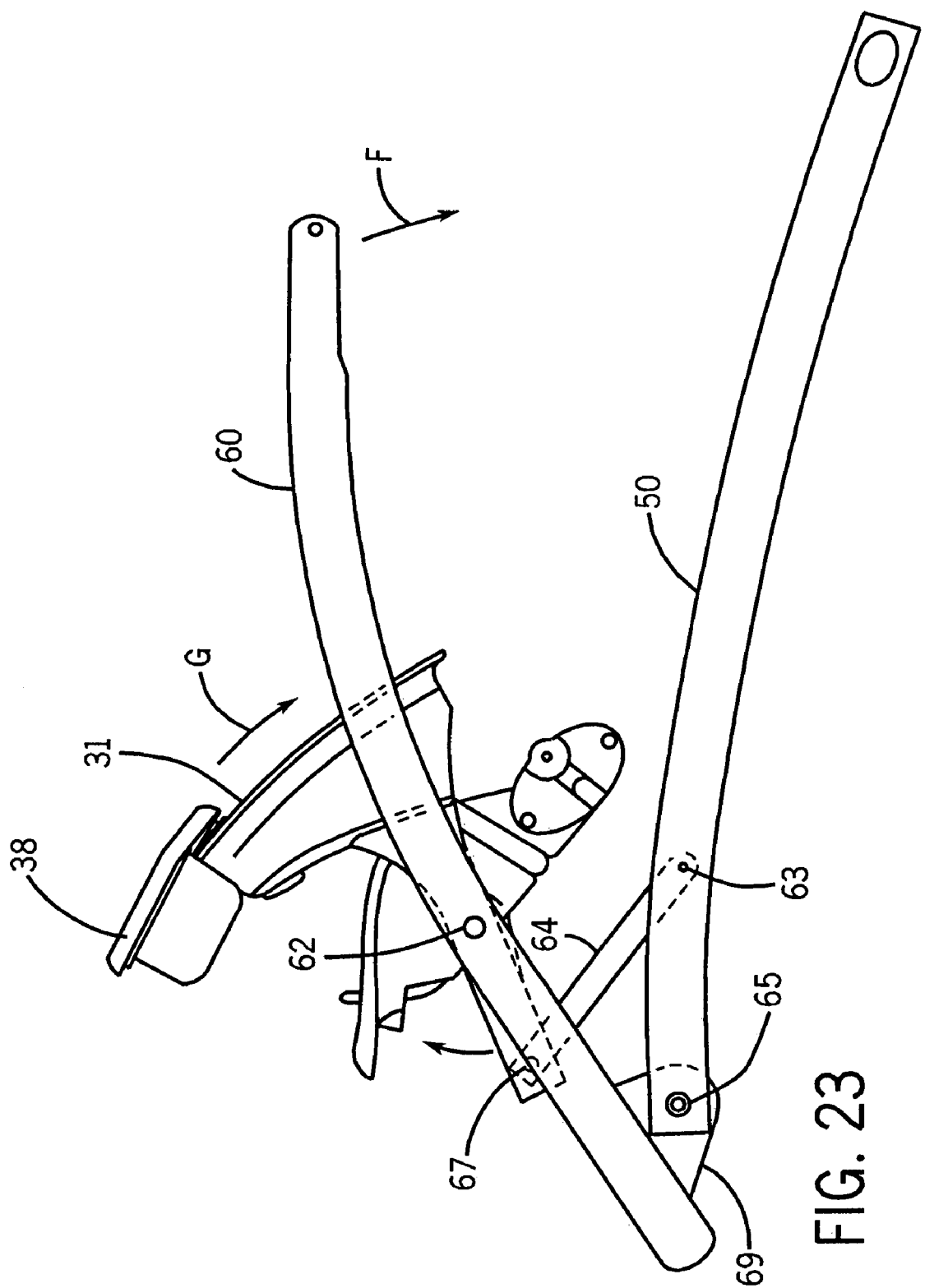
FIG. 23 is a side elevation view of the portion of the stroller illustrated in FIG. 22 as the stroller frame is partially folded.
Figure 25:
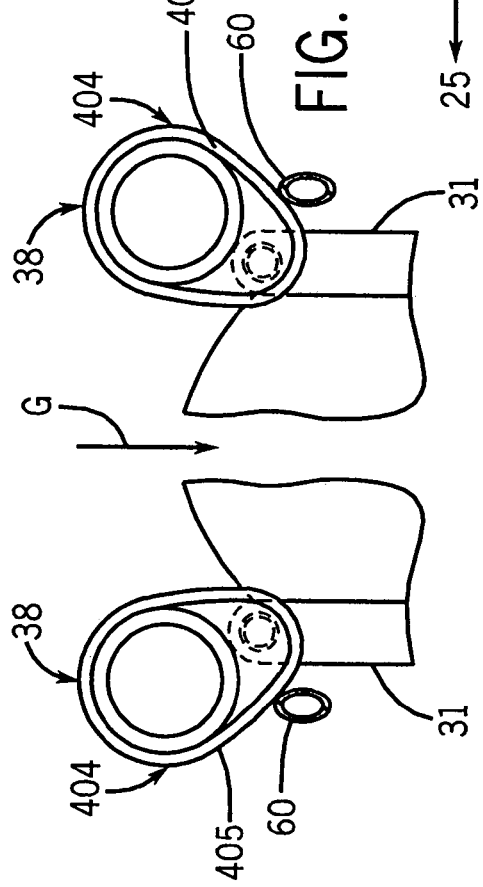
FIG. 25 is a side elevation view taken along line 25-25 of FIG. 24.
Figure 24:
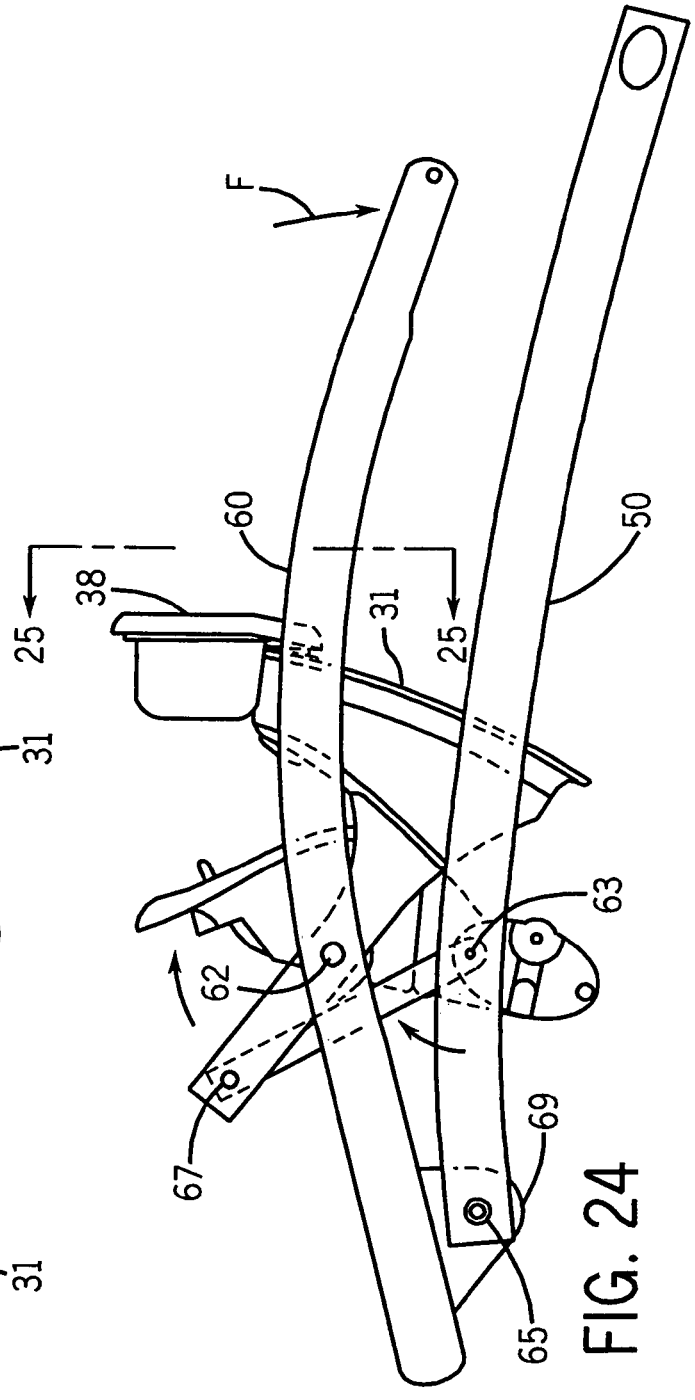
FIG. 24 is a side elevation view of the portion of the stroller illustrated in FIG. 23 as the stroller frame is nearly folded.

Referring also to FIGS. 19 and 21, the pivot assembly 410 further includes an outer collar 438 having an outer annulus 440. The lower end 465 of the annulus 440 presents a conical surface. An upper radial flange 451 extends from the upper end of the annulus 440, and defines a plurality of vertical notches 455 extending into the radially inner surface of flange 451. The notches 455 receive a pair of the tabs 435 of the type described above to couple the collar 438 and the sleeve 428 with respect to relative rotation. Furthermore, the annulus 440 includes a plurality of flexible tabs 453 extending radially inwardly from the lower end of annulus 440. The tabs 453 snap into the radial notch 441 extending into sleeve 428 to couple the collar 438 and sleeve 428 with respect to relative axial motion. A plurality of circumferentially spaced slots 442 extends vertically into the lower end of the outer annulus 440.

The outer collar 438 is further connected to the armrest 31 to prevent relative vertical and rotational movement between the collar 438 and the armrest 31. Specifically, a plurality of vertically spaced and vertically aligned pairs of flanges 444 and 446 project radially out from the upper end of the outer surface of annulus 440. Each pair of flanges 444 and 446 is radially spaced about the outer surface of annulus 440. A gap 448 is thus disposed between each pair of flanges 444 and 446. The gap 448 receives the upper surface of armrest 31, thereby locking the collar 438 and the armrest with respect to relative vertical movement. One of the flanges 446 extends from a key 457 that projects radially outward form the annulus 440. The key 457 is received by the armrest 31 to prevent the collar 438 from rotating within the armrest 31.

The pivot assembly 410 further includes a release 450 having an annular body 452. A plurality of locking tabs 454 extends out from the annular body 452 and is received within the slots 442 of the outer collar 438, thereby interlocking the release 450 and the collar 438 with respect to rotation. The lower end of at least one of the locking tabs 454 sits against the lower surface of the armrest 31, thereby supporting the release 450 within the armrest 31, thus providing a lower limit for the release 450. A portion of the annular body 452 projects down below the armrest and is accessible to the user.

The release further includes a frustoconical upper annulus 461 extending up from the annular body 452. The upper annulus 461 has a diameter that increases from the top toward the annular body 452, and has a profile that corresponds with the profile of conical surface 465 of annulus 440. Accordingly, the user can push up against the annular body 452 and cause the annulus 461 to ride inside the conical surface 465 of the collar 438, thereby causing the outer annulus 440 to flare radially outwardly, removing the tabs 453 from engagement with the notch 441 of sleeve 428. Once the tabs 453 are removed from the notch 441, the sleeve 428 can be pulled vertically upward and removed from the collar. The cup holder 38 is thus removable connected to the armrest 31.

The lock 450, outer collar 438, and inner sleeve 428 are thus all locked together with respect to rotational movement to prevent circumferential slippage. Because the stem 416 is rotatable within the inner sleeve 428, the cup holder 38 is rotatable about the armrest 31.

Referring now to FIGS. 22-25, once the latch 56 is released, the stroller frame 22 is folded as a four-bar linkage including 1) that portion of leg 50 extending between pivot joints 65 and 63; 2) linkage 64; 3) that portion of the armrest 31 extending between pivot joints 62 and 67; and 4) that portion of side arm 60 and flange 69 extending between pivot joints 62 and 65. The stroller frame is folded by translating the side arms 60 of support bar down along the direction of Arrow F (FIG. 23) thereby causing each side arm 60 to pivot with respect to leg 50 about pivot joint 65. The side arm 60 further pivots with respect to armrest 31 about pivot joint 62. The armrest 31 further pivots with respect to the upper end of linkage 64 about pivot joint 67. This further causes linkage 64 to pivot at its lower end about the leg 50 at pivot joint 63. The downward movement of side arms 60 causes the corresponding armrest 31 and associated cup holder 38 to likewise move down along the direction of Arrow G. The connections between the armrest 31 at pivot joints 62 and 67 cause the armrest 31 to translate down. The annular rotation of the armrest 31 about pivot joint 62 is greater than that of the side arm 60 about pivot joint 65. As a result, referring to FIGS. 24-25, as the stroller frame 22 continues to fold, the gap between the cup holder 38 and the side arm 60 decreases. Furthermore, the side arm 60 is in vertical alignment with the outer surface 405 of the flange 404 at a location outboard of the pivot assembly 410.

Accordingly, as illustrated in FIGS. 26-27, the outer surface 405 of each armrest 38 provides a cam surface such that the inner edge of side arm 60 rides along the proximal end of the outer surface 405. The side arm 60 thus provides a force against the outer surface 405 of flange 404 that overcomes the biasing force of spring 436 and causes each the cup holder 38 to pivot radially inwardly about the pivot assembly 410 (and thus about the front end of armrest 31) along the direction of Arrow H toward a retracted position. As the frame 22 continues to fold to its fully folded position, the side arm 60 continues to ride along the outer surface 405 in a direction from the proximal end towards the distal end of the outer surface 405. As described above, the horizontal width of the outer surface 405 increases from the proximal end of the flange 404 toward the distal end of the flange. As a result, as the frame 22 continues to fold, each side arm 60 biases the corresponding cup holder 38 continuously radially inward towards the retracted position. When the frame 22 is fully folded, each cup holder 38 is fully retracted and disposed inboard of the corresponding side arm 60 and at least a portion of the cup holder 38 is horizontally aligned with the corresponding side arm 60. Advantageously, because the cup holders 38 are stowed and tucked inboard of the side arms 60 when retracted, the side arms 60 guard against accidental and possible damaging contact with the cup holders 38.

When the frame 22 is unfolded, each armrest 31 translates upward at a rate faster than that of the corresponding side arm 60. Accordingly, each flange 405 rides along the corresponding side arm 60 in a direction toward the proximal end of outer surface 405 and increasingly out of interference with the cup holder 38. Accordingly, the torsional force of spring 406 causes the cup holder 38 to rotate outwardly toward the extended position until the side arm 60 is removed from interference with the cup holder 38, at which point the cup holder is automatically biased by spring 436 to its extended position.

It should be appreciated that the pivot assembly illustrated and described with reference to FIGS. 16-21 is just one of numerous embodiments intended to fall within the scope of the present invention. One having ordinary skill in the art will therefore appreciate that the present invention is intended to include any suitable alternative assembly that is capable of biasing the cup holder 38 to an extended position while allowing the cup holder to move against the biasing force to a retracted position. For instance, the present invention recognizes that the biasing assembly 410 need not necessarily pivot or impart rotational motion onto the cup holder 38, and that the biasing assembly 410 could rather impart linear or horizontal forces on the cup holder that bias the cup holder to an extended position. The cup holder could cam against the frame 22 in the manner described to act against the biasing force and cause the cup holder to move to a retracted position inwardly of the biasing frame member.

Furthermore, while the cup holder 38 is pivotable about the armrest 31 between the extended and retracted position, the present invention recognizes that the armrest 31 could be pivotably or otherwise movably connected to the frame, such that the frame biases the armrest 31, and therefore the cup holder 38, between an extended and a retracted position. Likewise, the armrest 31 and cup holder 38 could remain stationary, and a portion of the frame (for instance side arm 60) could slide over the outer surface of the corresponding cup holder 38. For this reason, it can be said that the cup holder 38 is movable with respect to the frame 22 between the retracted and the extended positions.

The above has been described as a preferred embodiment of the present invention. It will occur to those that practice the art that many modifications may be made without departing from the spirit and scope of the invention. In order to apprise the public of the various embodiments that may fall within the scope of the invention, the following claims are made.

What is claimed is:

1. A stroller, foldable between an open position and a folded position, comprising:
   a foldable stroller frame movably supported by at least one wheel;
   a child seat supported by the stroller frame;
   a cup holder having outer surface and supported by the stroller frame and movable relative to the frame between a retracted position and an extended position; and
   a biasing member providing a force against the cup holder that biases the cup holder toward the extended position;
   wherein when the stroller frame is folded, a stroller frame member rides along the outer surface of the cup holder and applies a force against the cup holder that overcomes the force of the biasing member and causes the cup holder to move toward the retracted position.

2. The stroller as recited in claim 1, further comprising an armrest for the child seat, wherein the cup holder is mounted onto the armrest.

3. The stroller as recited in claim 2, wherein the cup holder pivots with respect to the armrest.

4. The stroller as recited in claim 3, wherein the biasing member comprises a pivot assembly having a spring that applies the force that biases the cup holder toward the extended position.

5. The stroller as recited in claim 4, wherein the biasing member is attached to the armrest.

6. The stroller as recited in claim 4, wherein the cup holder is pivotally supported by the biasing member.

7. The stroller as recited in claim 4, further comprising a hub extending down from the armrest, wherein the pivot assembly comprises a sleeve surrounding the hub such that the hub pivots within the sleeve, and wherein the sleeve is pivotally locked with the armrest.

8. The stroller as recited in claim 1, wherein the outer surface comprises a flange extending radially outward from an upper end of the cup holder.

9. The stroller as recited in claim 1, wherein the cup holder is spaced a distance from the stroller frame member when the stroller frame is unfolded, and wherein the distance decreases as the stroller frame is folded.

10. The stroller as recited in claim 1, wherein the cup holder is disposed outboard of the stroller frame member when the cup holder is in the extended position.

11. The stroller as recited in claim 1, wherein a portion of the frame rides along a surface of the cup holder to cause the cup holder to move toward the retracted position.

12. The stroller as recited in claim 1, wherein the cup holder is tucked inboard of the stroller frame member when the cup holder is in the retracted position.

13. The stroller as recited in claim 1, wherein the stroller frame comprises a base supported on front and rear wheels, a support strut extending up from the base, a push arm extending rearward from the strut and supporting a handlebar, and a support bar extending forward from the support strut and supporting the cup holder.

14. The stroller as recited in claim 13, wherein the stroller frame member comprises the support bar.

15. The stroller as recited in claim 1, wherein the cup holder is removable from the stroller frame.

16. A stroller, foldable between an open position and a folded position, comprising:
   a foldable stroller frame movably supported by front and rear wheels;
   a cup holder supported by the frame and movable between a retracted position and an extended position;
   a biasing member biasing the cup holder toward the extended position; and
   a frame member of the stroller frame spaced from the cup holder in the extended position,
   wherein the frame member rides along an outer surface of the cup holder so that the cup holder moves toward the retracted position by contact with the part as the stroller moves toward the folded position.

17. The stroller as recited in claim 16, wherein the cup holder moves toward the extended position as the stroller is moved from the folded position toward the open position.

* * * * *

UNITED STATES PATENT AND TRADEMARK OFFICE
CERTIFICATE OF CORRECTION

| | |
|---|---|
| PATENT NO. | : 7,614,640 B2 |
| APPLICATION NO. | : 11/688836 |
| DATED | : November 10, 2009 |
| INVENTOR(S) | : Dean et al. |

It is certified that error appears in the above-identified patent and that said Letters Patent is hereby corrected as shown below:

In the claims:
Column 13
claim 1, line 43, please insert -- an -- before "outer surface".
Column 14
claim 16, line 52, please delete "part" and replace with -- frame member --.

Signed and Sealed this
Twenty-fourth Day of April, 2012

David J. Kappos
*Director of the United States Patent and Trademark Office*